(12) United States Patent
Wu et al.

(10) Patent No.: US 10,220,946 B2
(45) Date of Patent: Mar. 5, 2019

(54) SPRAYING SYSTEM HAVING A LIQUID FLOW AND ROTATING SPEED FEEDBACK

(71) Applicant: SZ DJI TECHNOLOGY Co., Ltd., Shenzhen (CN)

(72) Inventors: Xumin Wu, Shenzhen (CN); Zhuang Feng, Shenzhen (CN); Jiyuan Ao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 109 days.

(21) Appl. No.: 15/241,715

(22) Filed: Aug. 19, 2016

(65) Prior Publication Data

US 2017/0129605 A1 May 11, 2017

Related U.S. Application Data

(63) Continuation of application No. PCT/CN2015/080531, filed on Jun. 1, 2015.

(51) Int. Cl.
| | | |
|---|---|---|
| *B64D 1/18* | (2006.01) | |
| *A01M 7/00* | (2006.01) | |
| *B05B 12/02* | (2006.01) | |
| *B64C 39/02* | (2006.01) | |
| *G01S 19/00* | (2010.01) | |

(Continued)

(52) U.S. Cl.
CPC .................. *B64D 1/18* (2013.01); *A01M 7/00* (2013.01); *A01M 7/0089* (2013.01); *B05B 9/0413* (2013.01); *B05B 12/004* (2013.01); *B05B 12/02* (2013.01); *B05B 12/081* (2013.01); *B05B 12/126* (2013.01); *B05B 13/005* (2013.01); *B64C 39/024* (2013.01); *G01S 19/00* (2013.01);

(Continued)

(58) Field of Classification Search
CPC ...................................................... B64D 1/18
See application file for complete search history.

(56) References Cited

U.S. PATENT DOCUMENTS

| | | | |
|---|---|---|---|
| 2,043,262 A | 6/1936 | Oglesby et al. | |
| 3,008,376 A | 11/1961 | Brunow | |

(Continued)

FOREIGN PATENT DOCUMENTS

| | | |
|---|---|---|
| CN | 1428511 A | 7/2003 |
| CN | 101356373 A | 1/2009 |

(Continued)

OTHER PUBLICATIONS

U.S. Appl. No. 15/241,667, filed Aug. 19, 2016, Bei et al.

(Continued)

*Primary Examiner* — Manuel A Rivera Vargas
(74) *Attorney, Agent, or Firm* — Anova Law Group, PLLC

(57) ABSTRACT

Systems and methods can determine a liquid flow in a spraying system. An amount of liquid that is output from the spraying system during a pump cycle is determined. A number of pump cycles that occur within a given amount of time are measured. The number of pump cycles are measured using an electronic speed controller (ESC). Additionally, the ESC indicates the number of pump cycles within a given amount of time within a threshold of precision. The amount of liquid flow in the spraying system is calculated based on the measured number of pump cycles and the determined amount of liquid that is output from the spraying system.

29 Claims, 18 Drawing Sheets

(51) Int. Cl.
    *B05B 12/00*     (2018.01)
    *B05B 12/12*     (2006.01)
    *B05B 9/04*     (2006.01)
    *B05B 12/08*     (2006.01)
    *B05B 13/00*     (2006.01)
    *G01S 19/14*     (2010.01)

(52) U.S. Cl.
    CPC .... *B64C 2201/12* (2013.01); *B64C 2201/128* (2013.01); *G01S 19/14* (2013.01)

(56) References Cited

U.S. PATENT DOCUMENTS

| | | | |
|---|---|---|---|
| 3,220,482 A | | 11/1965 | Eveleth |
| 3,428,276 A | | 2/1969 | Hubbard |
| 3,463,398 A | | 8/1969 | Smith et al. |
| 3,682,418 A | | 8/1972 | Harter |
| 3,936,018 A | | 2/1976 | Barlow |
| 4,467,657 A | * | 8/1984 | Olsson ............ G01F 1/00 73/861 |
| 5,096,390 A | | 3/1992 | Sevrain et al. |
| 6,285,938 B1 | | 9/2001 | Lang et al. |
| 2009/0112372 A1 | | 4/2009 | Peterson |
| 2012/0241533 A1 | | 9/2012 | Moeller et al. |
| 2013/0320106 A1 | | 12/2013 | Schmidt |

FOREIGN PATENT DOCUMENTS

| | | |
|---|---|---|
| CN | 101963806 A | 2/2011 |
| CN | 102591302 A | 7/2012 |
| CN | 102635537 A | 8/2012 |
| CN | 102749926 A | 10/2012 |
| CN | 102865892 A | 1/2013 |
| CN | 103803083 A | 5/2014 |
| CN | 203598980 U | 5/2014 |
| CN | 203652111 U | 6/2014 |
| CN | 104069970 A | 10/2014 |
| EP | 2564696 A1 | 3/2013 |
| GB | 1405131 A | 9/1975 |
| WO | WO 2006/057957 A2 | 6/2006 |
| WO | WO 2007/061956 A2 | 5/2007 |
| WO | WO 2013/130497 A1 | 9/2013 |
| WO | WO 2014/028435 A1 | 2/2014 |

OTHER PUBLICATIONS

International search report and written opinion dated Feb. 24, 2016 for PCT/CN2015/080530.

International search report and written opinion dated Mar. 7, 2016 for PCT/CN2015/080531.

* cited by examiner

SPRAYING SYSTEM HAVING A LIQUID FLOW AND ROTATING SPEED FEEDBACK

CROSS-REFERENCE

This application is a continuation of PCT application number PCT/CN2015/080531, filed on Jun. 1, 2015, the entire contents of which are incorporated herein by reference.

BACKGROUND OF THE INVENTION

Agricultural spraying systems may be used to spread pesticide or fertilizer across crops. However, conventional agricultural spraying systems may utilize heavy and complicated equipment, such as a separate flow detecting apparatus, which may be difficult to control. Additionally, it may be difficult to control the velocity and pressure of sprayed liquid when using conventional spraying systems. The drawbacks of such systems may prevent aerial systems from being efficiently used to provide pesticide and fertilizer to crop areas. For example, the lack of a mobile, efficient pumping system may keep agricultural spraying systems, such as those associated with aerial vehicles such as unmanned aerial vehicles (UAVs), from maximizing their use as aerial spraying systems.

SUMMARY OF THE INVENTION

Systems and methods are provided for determining a liquid flow in a spraying system. In particular, the spraying system may be used to distribute pesticide and fertilizer to agricultural areas using a spraying apparatus and an efficient pumping system. As such, systems and methods are related to spraying systems, including agricultural spraying systems.

By providing efficient systems of determining liquid flow in the spraying system, the present disclosure may be used to improve agricultural spraying systems, such as those associated with aerial vehicles such as unmanned aerial vehicles (UAVs). The use of agricultural UAVs allow for spraying operations to be controlled by a ground remote controller. Additionally, use of agricultural UAVs allow for spraying operations to be controlled through the use of a global positioning service (GPS) signal. An agricultural UAV can be used to spray pesticide, seeds, powders, etc. Additionally, an agricultural UAV can operate at a low altitude with less drifting, and the UAV can hover without the need for dedicated airport. Further, the downward airflow generated by the rotors may facilitate a penetrating of the sprayed substance; therefore, the spraying effect is improved. Since the agricultural UAV can be operated over a long distance and the operator may not be exposed to the pesticide, a safety in spraying operation may be improved. Furthermore, at least 50 percent of the pesticide and 90 percent of water may be saved by using an UAV spraying technology. As such, it is beneficial to provide improvements to a pumping system of an agricultural UAV to make its use more efficient.

An aspect of the invention may include a method of determining a liquid flow in a spraying system. The method may comprise determining an amount of liquid that is output from the spraying system during a pump cycle. The method may also comprise measuring a number of pump cycles that occur within a given amount of time, wherein the number of pump cycles are measured using an electronic speed controller (ESC), wherein the ESC indicates the number of pump cycles within a given amount of time within a threshold of precision. Additionally, the method may comprise calculating the amount of liquid flow in the spraying system based on the measured number of pump cycles and the determined amount of liquid that is output from the spraying system.

Another aspect of the invention may include a non-transitory computer readable medium containing program instructions for determining a liquid flow in a spraying system. The computer readable medium may comprise program instructions for determining an amount of liquid that is output from the spraying system during a pump cycle. The computer readable medium may also comprise program instructions for measuring a number of pump cycles that occur within a given amount of time, wherein the number of pump cycles are measured using an electronic speed controller (ESC), wherein the ESC indicates the number of pump cycles within a given amount of time within a threshold of precision. Additionally, the computer readable medium may comprise program instructions for calculating the amount of liquid flow in the spraying system based on the measured number of pump cycles and the determined amount of liquid that is output from the spraying system.

Additionally, an aspect of the invention may include a system for determining a liquid flow in a spraying system. The system may comprise one or more processors of a mobile platform, individually or collectively configured to determine an amount of liquid that is output from the spraying system during a pump cycle. The one or more processors may also be configured to measure a number of pump cycles that occur within a given amount of time, wherein the number of pump cycles are measured using an electronic speed controller (ESC), wherein the ESC indicates the number of pump cycles within a given amount of time within a threshold of precision. Additionally, the one or more processors may be configured to calculate the amount of liquid flow in the spraying system based on the measured number of pump cycles and the determined amount of liquid that is output from the spraying system.

Another aspect of the invention may include a system for determining a spraying liquid flow. The system may comprise a spraying system. Additionally, the system may comprise one or more processors of a mobile platform that are individually or collectively configured to measure a number of pump cycles that occur within a given amount of time, wherein the number of pump cycles are measured using an electronic speed controller (ESC), wherein the ESC indicates the number of pump cycles within a given amount of time within a threshold of precision. The one or more processors may also be configured to calculate the amount of liquid flow in the spraying system based on the measured number of pump cycles and a configured amount of liquid that is output from the spraying system.

A further aspect of the present invention may include a method of controlling a work schedule of a spraying system of a mobile platform. The method may comprise receiving operating characteristics of the spraying system at a processor of the mobile platform. Additionally, the method may comprise generating one or more controlling signals that relate to a work schedule of the spraying system of the mobile platform, wherein the one or more controlling signals are generated based on the received operating characteristics of the spraying system. The method may also comprise providing the generated one or more controlling signals to the spraying system.

An aspect of the present invention may also include a non-transitory computer readable medium containing program instructions for controlling a work schedule of a spraying system of a mobile platform. The computer readable medium may comprise program instructions for receiving operating characteristics of the spraying system at a processor of the mobile platform. The computer readable medium may also comprise program instructions for generating one or more controlling signals that relate to a work schedule of the spraying system of the mobile platform, wherein the one or more controlling signals are generated based on the received operating characteristics of the spraying system. Additionally, the computer readable medium may comprise program instructions for providing the generated one or more controlling signals to the spraying system.

Another aspect of the invention may include a system for controlling a work schedule of a spraying system of a mobile platform. The system may include a spraying system. Additionally, the system may include one or more processors of the mobile platform, individually or collectively configured to receive operating characteristics of the spraying system. The one or more processors may also be configured to generate one or more controlling signals that relate to a work schedule of the spraying system of the mobile platform, wherein the one or more controlling signals are generated based on the received operating characteristics of the spraying system. Additionally, the one or more processors may be configured to provide the generated one or more controlling signals to the spraying system.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DETAILED DESCRIPTION OF THE INVENTION

Figure 1:
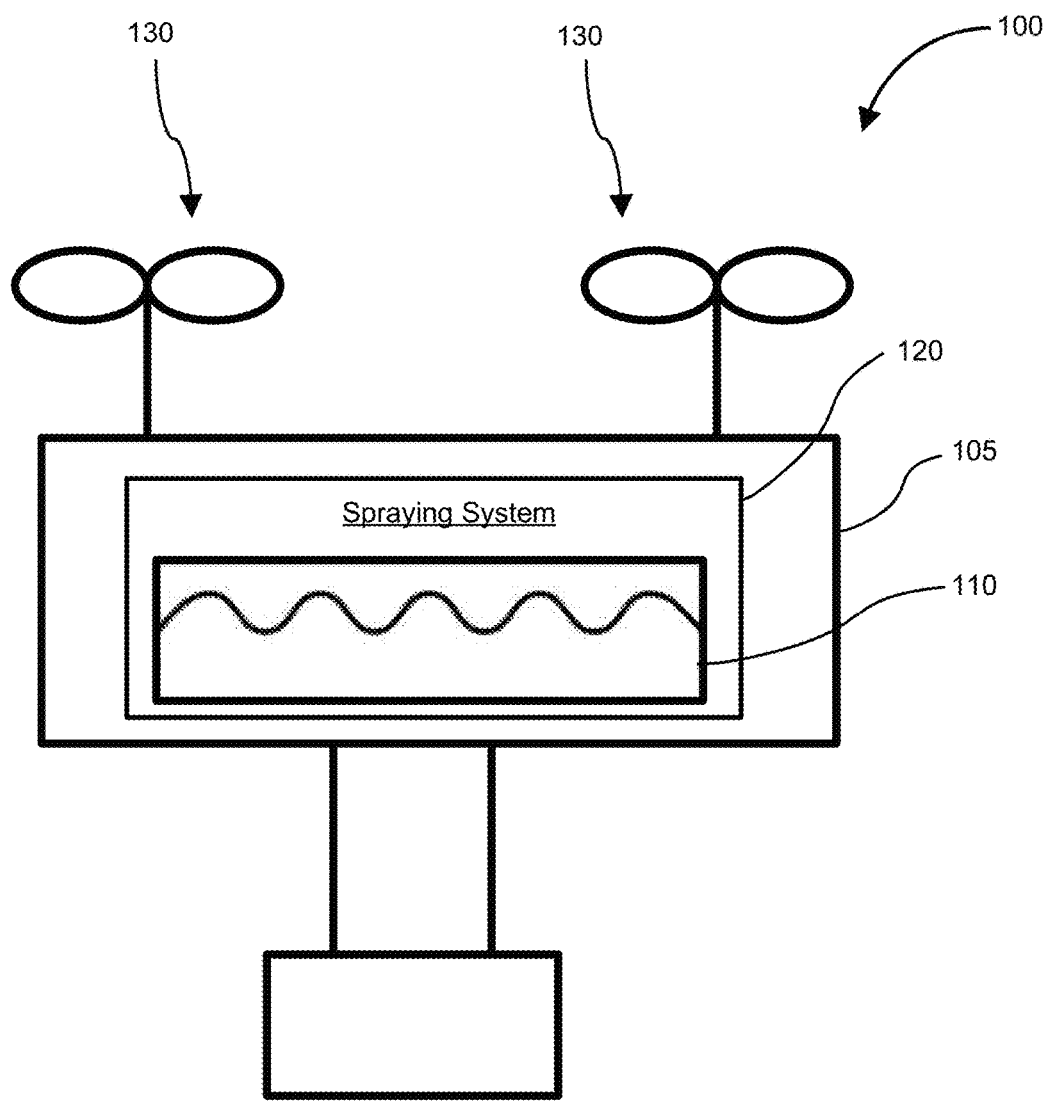
FIG. 1 illustrates a schematic of an unmanned aerial vehicle (UAV) with an on-board fluid reservoir that contains a first amount of fluid, in accordance with embodiments of the invention.

Systems and methods are provided for determining a liquid flow in a spraying system. A spraying system can use a separate flow velocity detecting apparatus to provide information related to fluid flow and fluid characteristics with in a spraying system. However, this leads to heavy, complicated equipment which may be detrimental when used on aerial vehicles, such as an unmanned aerial vehicle (UAV). In particular, the addition of heavy equipment may be taxing to the UAV and may shorten the amount of time the UAV is in the air. Additionally, velocity and pressure conditions of the conventionally spraying systems may significantly affect the effect of the spraying fluid within the spraying system. Unfortunately, it is difficult to control the pressure and flow amount within a conventional spraying system without adding excessive equipment to the UAV.

The spraying system may be used to distribute pesticide and fertilizer to agricultural areas using a spraying apparatus and an efficient pumping system. Liquid flow within the spraying system may be evaluated using an electronic speed controller. In particular, the electronic speed controller may assess operating characteristics of the pumping system and may use the information to determine fluid flow. Additionally, the fluid flow may be used to determine when a level of liquid in a reservoir has fallen below a certain point which may indicate that the driving apparatus should stop. Alternatively, the determination that the liquid has fallen below a certain threshold may indicate that the UAV should turn around and go back to its site of origin.

The present disclosure may be used to improve agricultural spraying systems, such as those associated with aerial vehicles such as unmanned aerial vehicles (UAVs). The use of agricultural UAVs allow for spraying operations to be controlled by a ground remote controller. Additionally, use of agricultural UAVs allow for spraying operations to be controlled through the use of a global positioning service (GPS) signal. An agricultural UAV can be used to spray pesticide, seeds, powders, etc. Additionally, an agricultural UAV can operate at a low altitude with less drifting, and the UAV can hover without the need for dedicated airport. Further, the downward airflow generated by the rotors may facilitate a penetrating of the sprayed substance; therefore, the spraying effect is improved. Since the agricultural UAV can be operated over a long distance and the operator may not be exposed to the pesticide, a safety in spraying operation may be improved.

Examples of spraying system are provided, as illustrated in figures below. FIG. 1 illustrates a schematic of an unmanned aerial vehicle (UAV) 100 with an on-board fluid reservoir 110 that contains a first amount of fluid, in accordance with embodiments of the invention. The UAV may have a housing 105. While the spraying system may contain a fluid reservoir to contain spraying materials, such as fluids, other containers may also or alternatively be used to store spraying materials. Spraying materials may include fluids, liquids, agricultural materials, agricultural mediums, agricultural products, slurries, gaseous components, powders, and other products described herein. Additionally, in examples, spraying materials may be stored in a fluid reservoir, a product container, a product reservoir, or other storage containers of spraying materials. The spraying material storage area, such as a reservoir, may be made of rigid, semi-rigid, or flexible material. Additionally, the spraying material storage area may have a volume of about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$3, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, 10 $m^3$. or greater than 10 $m^3$. Additionally, the spraying system may have a portion that contains spraying materials prior to dispersion. Further, the spraying system may disperse materials using spraying system outlets. An example of spraying system outlets includes nozzles.

The UAV 100 may be configured to fly in response to a signal from a remote terminal. The UAV may respond to manual instructions provided by a user via the remote terminal. The UAV may be configured to operate autonomously or semi-autonomously. The UAV may be capable of flight autonomously in accordance with instructions from one or more processors without requiring input from a user.

The UAV may be capable of flight with aid of one or more propulsion units 130 on-board the UAV. The propulsion units 130 may include one or more rotors driven by one or more actuators. The rotors may include one or more rotor blades that may generate lift for the UAV. The rotor blades may rotate to generate lift for the UAV. In some embodiments, the UAV may include multiple propulsion units (e.g., two or more, three or more, four or more, five or more, six or more, seven or more, eight or more, nine or more, or ten or more propulsion units). The propulsion units may be capable of generating lift for the UAV. The propulsion units may operate in accordance with a flight control unit. The flight control unit may be on-board the UAV. The flight control unit may generate signals to control the propulsion units in accordance with signals from a remote terminal. The UAV may be capable of taking off and/or landing vertically with aid of the one or more propulsion units.

The UAV may comprise a central body. One or more arms may extend from the central body. In some embodiments, the arms may extend radially from the body. The arms may extend symmetrically from the UAV. The UAV may have two halves that may mirror one another. The arms may be radially symmetric from one another. The arms may or may not be equally spaced apart from one another. The one or more propulsion units may be supported by the one or more arms of the UAV. For instance, the one or more propulsion units may be attached to the arms of the UAV. The one or more propulsion units may be attached at or near the end of the arms of the UAV. The one or more propulsion units may be positioned within 50%, 40%, 30%, 25%, 20%, 15%, 10%, 5%, 3%, 1%, or 0.5% of the end of the arms, along the length of the arm.

The UAV may have a housing 105. The housing may partially or completely enclose one or more components of the UAV. The housing may form the central body. The housing may form an enclosure of the central body. The housing may or may not form the arms or a portion of the arms. The housing may or may not form an enclosure of the arms. In some embodiments, the arms may be separably attached to the central body. Alternatively, the arms may be affixed to the central body, or may be integrally formed with the central body. A housing may be formed of a single piece or multiple pieces. The housing may form a single integral piece for the central body and/or the arms. Alternatively, the housing may be a single integral piece for the central body while the arms are formed from separate pieces. In some instances, the housing may be formed as multiple pieces for the central body. The housing may be formed as multiple pieces for the central body and the arms. In some instances, the housing may form a shell or cover that may enclose one or more components.

The housing may define an interior space or cavity. The interior space or cavity may contain one or more electrical components of the UAV. For example, the flight control unit may be provided within the interior space or cavity of the housing. Other examples of components that may be within the interior cavity may include sensors, navigation units (e.g., global positioning system (GPS), inertial measurement unit (IMU), communication units (e.g., for direct or indirect forms of communication), image processing units, payload data or control units, power control units, or any other type of components. For instance, a power source that may power the UAV may be provided within an interior space or cavity. The housing may encompass or enclose one or more of these components.

The UAV may comprise one or more sensors to determine the temperature or pressure of the UAV. The UAV may further comprise other sensors that may be used to determine a location of the UAV, such as global positioning system (GPS) sensors, inertial sensors which may be used as part of or separately from an inertial measurement unit (IMU) (e.g., accelerometers, gyroscopes, magnetometers), lidar, ultrasonic sensors, acoustic sensors, WiFi sensors. The UAV can have sensors on board the UAV that collect information directly from an environment without contacting an additional component off board the UAV for additional information or processing. For example, a sensor that collects data directly in an environment can be a vision or audio sensor. Alternatively, the UAV can have sensors that are on board the UAV but contact one or more components off board the UAV to collect data about an environment. For example, a sensor that contacts a component off board the UAV to collect data about an environment may be a GPS sensor or another sensor that relies on connection to a another device, such as a satellite, tower, router, server, or other external device. Various examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). The sensors onboard or off board the UAV may collect information such as location of the UAV, location of other objects, orientation of the UAV, or environmental information. A single sensor may be able to collect a complete set of information in an environment or a group of sensors may work together to collect a complete set of information in an environment. Sensors may be used for mapping of a location, navigation between locations, detection of obstacles, detection of a target, or measurement of barometric pressure.

The UAV may include an on-board spraying system 120. The UAV may support the weight of the on-board spraying system while the UAV is flight. The UAV may support the weight of the on-board spraying system while the UAV is landed. The spraying system may include a pump, a driving apparatus, a fluid reservoir 110, one or more outlets, and an assembly for controlling flow of fluid from the fluid reservoir to the one or more outlets. The fluid may be an agricultural material, medium, and/or product. The fluid may include a liquid, a gaseous fluid, a slurry, or a combination thereof. In some embodiments, the fluid may include particles therein. For instance, the gaseous fluid may include powder or other particles that may be with the gaseous fluid. Any description herein of fluid handled by the spraying system may also apply to any particulates, powders, or other solid substances that may be handled by the spraying system.

The spraying system may be attached to the UAV. The spraying system may be mounted within the UAV, such as within a housing of the UAV. The spraying system may be within a space or cavity formed by the housing. In some instances, at least as portion of the spraying system may be within the housing. Optionally, a portion or all of the spraying system may be outside the housing of the UAV. In some instances, a portion of the spraying system may be within a housing of the UAV while a portion of the spraying system may be outside the housing of the UAV. For example, a fluid reservoir may be provided within a housing of the UAV while the one or more outlets may be provided outside the UAV. In some instances, a fluid reservoir and a fluid control assembly may be within the housing of the UAV while all or a portion of the outlet may protrude from the housing. In other instances, a fluid reservoir may be within the housing while the fluid control assembly and at least a portion of the outlet is outside the housing. In some instances, the fluid reservoir, the fluid control assembly, and at least a portion of the outlet may be outside the housing. Optionally, the fluid reservoir and at least a portion of the outlet may be outside the housing while the fluid control assembly is within the housing. Any combination of components of the spraying system may be provided within the housing, outside the housing, or both inside and outside the housing.

In some implementations, the spraying system, or a component of the spraying system, may be attached to an internal wall of the housing of the UAV. The spraying system, or a component of the spraying system, may be attached to an interior surface of the housing. The spraying system, or a component of the spraying system, may be attached to a floor, side-wall, or ceiling of the housing. Any of the components of the housing system may be attached to an internal wall of the housing. The spraying system, or any components thereof, may be arranged on the UAV so that the components of the UAV remain fixed relative to the UAV. Alternatively, the spraying system may be externally mounted to the UAV. One or more components of the spraying system may be mounted externally to the UAV. Any description herein of a spraying system may apply to any individual components of the spraying system as described anywhere herein.

The spraying system may be mounted such that the center of gravity of the spraying system is lower than the center of gravity of the UAV as a whole. The spraying system may be mounted such that the center of gravity of the spraying system is within a central region of the UAV. The spraying system may be mounted so that the center of gravity of the spraying system is not too offset to the side. The spraying system may be arranged so that it is laterally within about equal to or less than 50%, 40%, 30%, 20%, 10%, 5%, 3%, or 1% of a center of the UAV.

The spraying system may operate while the UAV is flight. Operation of the spraying system may include delivery of fluid from a fluid reservoir to one or more outlets of the spraying system. For example, the spraying system may include a spraying apparatus. The spraying apparatus may be mounted to the UAV. The spraying apparatus may be attached within the UAV. The spraying apparatus may be supported by the central body of the UAV. The spraying system may be attached to the central body of the UAV. The spraying system may be externally mounted to the UAV. The spraying system may be internally mounted to the UAV. The spraying apparatus may be supported by a landing stand. The spraying apparatus may be between a landing stand when a UAV is resting on a surface.

In this example, a pump of the spraying system may deliver fluid from the fluid reservoir to outlets of the spraying apparatus. The fluid may be sprayed from the one or more outlets of the spraying apparatus. Thus, fluid may be sprayed from the UAV while the UAV is in flight. The spraying system may operate while the UAV is landed. The spraying system may optionally be prevented from operating while the UAV is landed. The spraying system may be able to operate only while the UAV is flight. The spraying system may automatically start operating while the UAV is in flight. The spraying system may automatically start operating when the UAV reaches a predetermined altitude. Alternatively, the spraying system may operate in response to a user command to operate. The user command to operate may be delivered with aid of a remote terminal.

The spraying system may operate with aid of a power source of the spraying system. The power source of the spraying system may or may not be the same as a power source that powers one or more propulsion units of the UAV. The power source of the spraying system may or may not be the same as a power source that powers one or more electrical components of the UAV. The power source of the spraying system may be provided within a housing of the UAV. The power source of the spraying system may alternatively be provided outside the housing of the UAV.

Figure 2:
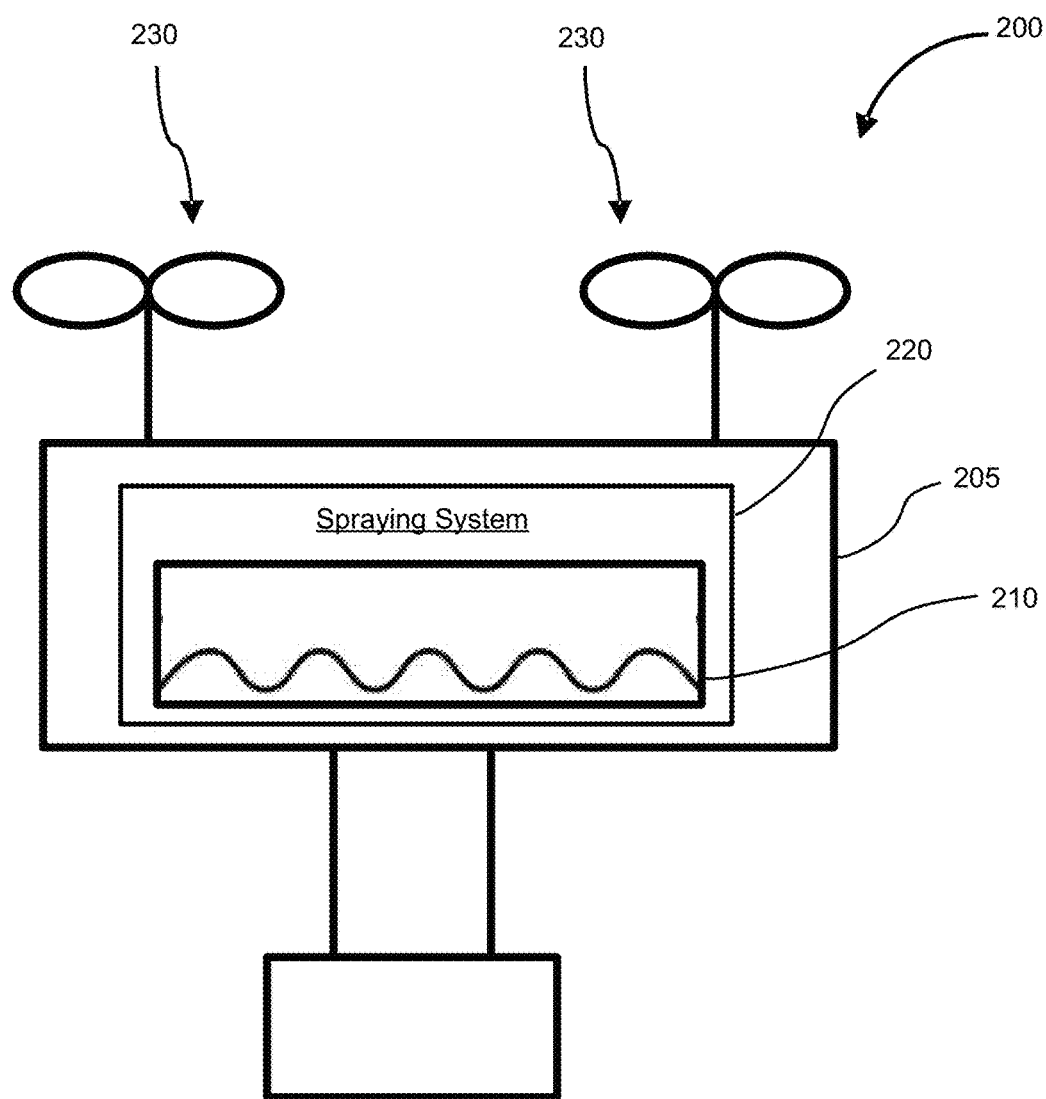
FIG. 2 illustrates a schematic of an unmanned aerial vehicle (UAV) with an on-board fluid reservoir that contains a second amount of fluid, in accordance with embodiments of the invention.

The on-board fluid reservoir of FIG. 1 provides a first amount of fluid. As a spraying system transfers the fluid within the fluid reservoir to a spraying apparatus, the amount of fluid within the fluid reservoir will decrease. Accordingly, FIG. 2 illustrates a schematic of an unmanned aerial vehicle (UAV) 200 with an on-board fluid reservoir 210 that contains a second amount of fluid, in accordance with embodiments of the invention. The UAV may include an on-board spraying system 220 that includes a fluid reservoir 210 within housing 205. In other examples, a fluid reservoir may be positioned outside of the UAV, as provided in FIG. 9. Additionally, the level of fluid within fluid reservoir may decrease as spraying materials stored within the fluid reservoir are sprayed from the UAV. The UAV may be capable of flight with aid of one or more propulsion units 230 on-board the UAV. While the amount of fluid within the liquid reservoir may be measured volumetrically, or even by weight based upon the density of the fluid, it is more difficult to determine the amount of fluid that is within a spraying system at any given time. In particular, it is difficult to determine the amount of fluid that is being processed by the spraying apparatus. This ambiguity is rooted in a number of factors, including the varying speed of a pump as it is exposed to different conditions and the difficulty in gauging how efficiently a spraying system is working.

Figure 3:
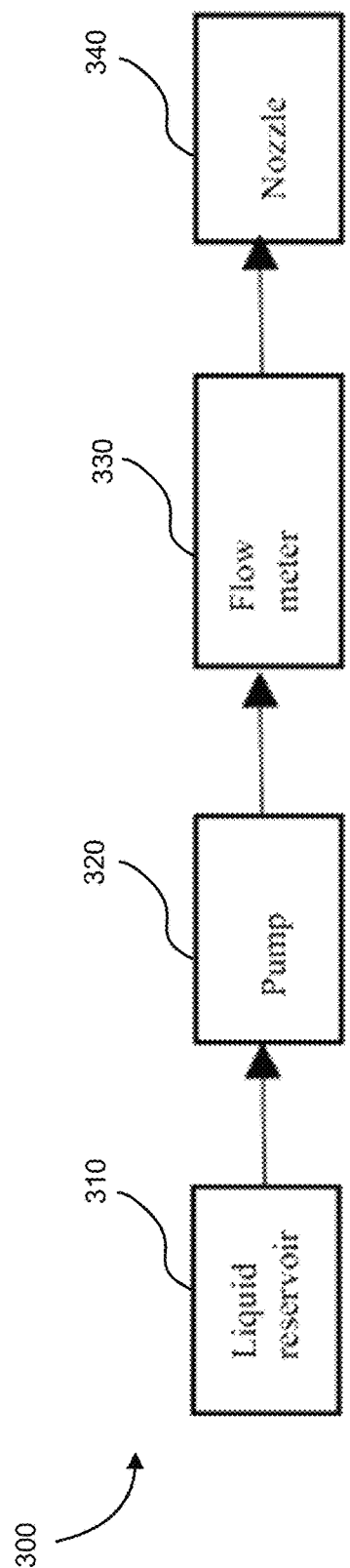
FIG. 3 illustrates a process of providing a liquid from a liquid reservoir to a nozzle using a flow meter, as provided in the prior art.

A flow meter apparatus may be introduced to determine characteristics of fluid within a spraying system. FIG. 3 illustrates a process 300 of providing a liquid from a liquid reservoir 310 to a nozzle 340 using a flow meter 330. In particular, a pump 320 transmits liquid from the liquid reservoir to the nozzle using the flow meter. The process of FIG. 3 illustrates the process that is used in conventional spraying systems. In particular, conventional spraying systems use separate equipment to provide a flow meter apparatus. In addition to requiring excess weight, the use of a flow meter apparatus may cause extra complications for the determination of fluid characteristics within a spraying system. Additionally, the use of a flow meter apparatus may generate different results based on conditions surrounding the apparatus.

Instead of using a flow meter apparatus, embodiments of the invention are directed towards the use of other forms of assessing fluid characteristics through the use of a spraying system without having to use a heavy, inconvenient, excessive device. In some instances, the spraying system may weigh no more than 400 kg. The weight of the spraying system may be less than or equal to about: 400 kg, 300 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 400 kg, 300 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

Figure 4:
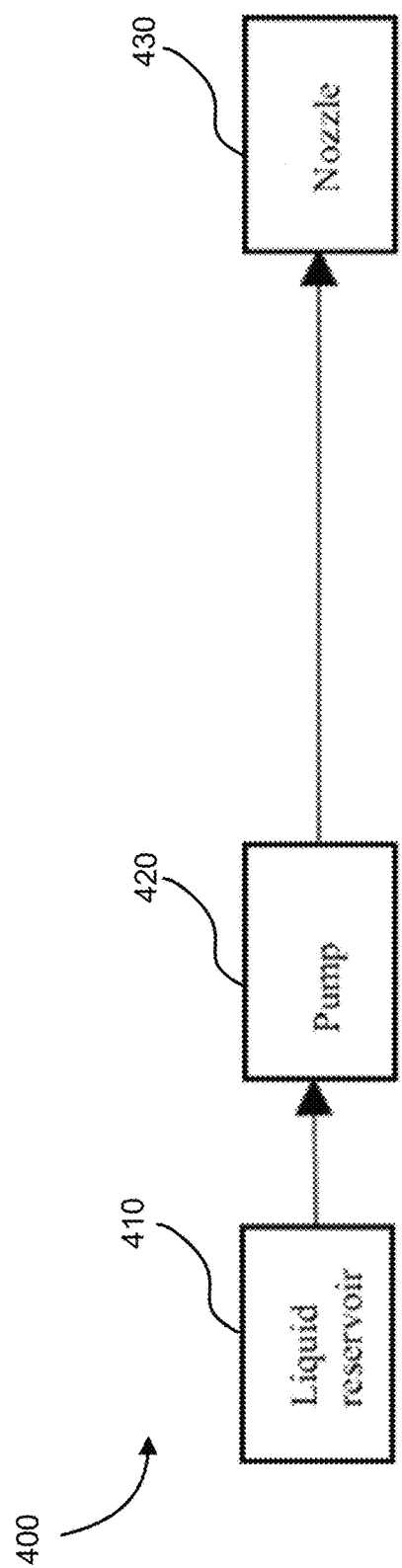
FIG. 4 illustrates a process of providing a liquid from a liquid reservoir to a nozzle without using a flow meter, in accordance with embodiments of the invention.

Accordingly, FIG. 4 illustrates a process 400 of providing a liquid from a liquid reservoir 410 to a nozzle 430 without using a flow meter, in accordance with embodiments of the invention. As seen in FIG. 4, a pump 420 transmits liquid from the liquid reservoir to the nozzle. In particular, methods and systems are provided for determining fluid flow within a spraying system utilizing an electronic speed controller.

The spraying system may include a driving apparatus. The driving apparatus may operate to effect the operation of the pump. The driving apparatus may be operatively connected to the pump such that rotational energy produced by the driving apparatus is received at the pump. In particular, the rotational energy that is generated by the driving apparatus may be transmitted to the pump using a motor shaft. The rotational energy produced by the driving apparatus may be received at an offset piece of a pump. The offset piece of the pump may be a part of a piston assembly within the pump such that rotational energy that is received at the eccentric from the driving apparatus is used to engage the piston assembly of the pump. When the driving apparatus is initiated, the pump may also be initiated. In particular, the movement of the piston may cause the diaphragm of a diaphragm pump to expand so as to take in fluid.

The pump in the spraying system may be used to transmit material from a fluid reservoir and provide that material to a pump outlet. Material from the reservoir may include liquids, such as pesticides, fertilizer, and water. Materials in the reservoir may be pressurized. Alternatively, materials from the reservoir may not be pressurized. Material from the reservoir may include powder, such as fire extinguishing powder. The pump may be connected to a fluid reservoir such that engaging the pump forms a vacuum at the fluid reservoir, which draws spraying material into the pump. The spraying material may then be transmitted through the pump to a pump outlet.

The pump outlet, in turn, may be connected to a spraying apparatus. During operation of the pump, pressure within the pump may build to a point where the spraying material may be expelled. An example of this is seen in a diaphragm pump, which expands to hold material in a chamber before expelling the mater. Accordingly, in examples, the pump may comprise a diaphragm pump. In particular, a diaphragm pump may be a volumetric pump that changes volume by reciprocating deformation of a diaphragm. Alternative pumps may also be used to effect the intake, transmittal, and expulsion of spraying material. In other examples, a pump may comprise a pressure-based pump, a hydraulic pump, a piston pump, or a centrifuge pump.

An electronic speed controller may be used to assess operating characteristics of a spraying system and use those operating characteristics to determine characteristics of fluid within a spraying system. A particular electronic speed controller that may be used is a field oriented control electronic speed controller to control the driving apparatus of the spraying system. The electronic speed controller may also be used for assessing speed of the driving apparatus. The electronic speed controller may also be used to signal alarms that are associated with levels of fluid within a fluid reservoir.

Figure 17:
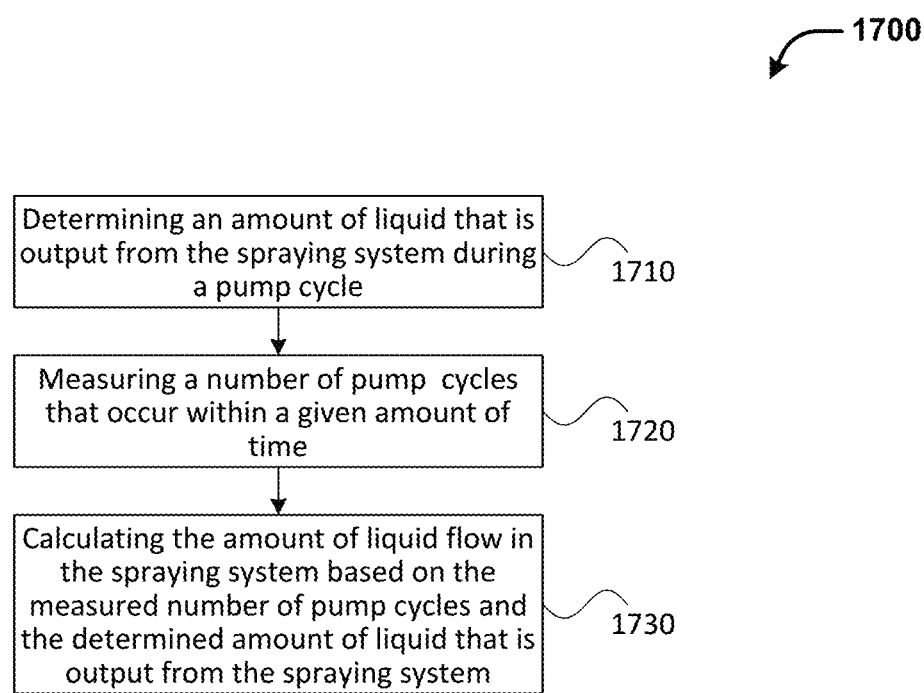
FIG. 17 illustrates a flowchart of a method of determining a liquid flow in a spraying system, in accordance with embodiments of the invention.

FIG. 17 illustrates a flowchart 1700 of a method of determining a liquid flow in a spraying system, in accordance with embodiments of the invention. At block 1710, an amount of liquid that is output from the spraying system during a pump cycle is determined. At block 1720, a number of pump cycles that occur within a given amount of time are measured. The pump cycles may be measured using an electronic speed controller. Additionally, the electronic speed controller may indicate the number of pump cycles within a given amount of time within a threshold of precision. At block 1730, the amount of liquid flow in the spraying system may be calculated based on the measured number of pump cycles. Additionally, the amount of liquid that is output from the spraying system is determined.

In examples, the liquid flow in a spraying system may be determined based on an assessment of a pump having a fixed volume chamber. In this example, each pump cycle is associated with a particular volume of liquid that flows through the pump chamber. The particular volume of liquid is determined based upon the fixed volume of the pump chamber. The pump, in turn, is operably coupled to a spraying apparatus such that the volume of liquid that flows out of the pump flows through the spraying apparatus and out of the spraying outlets. In examples, the volume of liquid that flows out of the pump equals to the volume of liquid that is output from the spraying outlets. In other examples, the volume of liquid that flows out of the pump is a function of the volume of liquid that is output from the spraying outlets. For instance, a spraying system may include a recycling system such that half of the volume of liquid that flows from the pump is recycled back to the fluid reservoir while half of the volume of liquid that flows from the pump flows through the spraying apparatus and out the spraying outlets. In further examples, some of the liquid that flows out of the pump may leak or evaporate prior to being output from the spraying outlets, and this loss of liquid may be modeled in calculation of volume that is output from the spraying system. Accordingly, an amount of liquid that is output during each pump cycle from the spraying system, which includes the pump and the spraying apparatus, may be determined.

Once the amount of liquid that is output during each pump cycle is determined, the number of pump cycles that occur within a given amount of time may be measured to determine liquid flow in the spraying system. The number of pump cycles may be measured using an electronic speed controller (ESC). In particular, the ESC may indicate the number of pump cycles within a given amount of time within a threshold of precision. Based on the amount of liquid that is output during each pump cycle and the number of pump cycles as measured during a period of time, the liquid flow in the spraying system may be calculated. In particular, the liquid flow in the spraying system may be calculated based on the measured number of pump cycles and the determined amount of liquid that is output from the spraying system during a pump cycle.

In other examples, the liquid flow in a spraying system may be determined based on an assessment of a pump having a variable chamber volume. The pump chamber volume may be variable in a predictable manner. The pump chamber volume may be variable in a dynamic manner. The pump chamber volume may be variable in a controlled manner. The pump chamber volume may be variable in an uncontrolled manner. In a pump having a variable chamber volume, the chamber volume of the pump may be continually assessed so as to determine the chamber volume of the pump chamber at any given time. This assessed volume may then be associated with a volume of liquid that flows through the pump in a given pump cycle.

The particular volume of liquid is determined based upon the volume of the pump chamber. As the volume of the pump chamber may vary, the particular volume of liquid may vary as well, and may vary in accordance with the variance of the volume of the pump chamber. The pump, in turn, is operably coupled to a spraying apparatus such that the volume of liquid that flows out of the pump flows through the spraying apparatus and out of the spraying outlets. In examples, the volume of liquid that flows out of the pump equals to the volume of liquid that is output from the spraying outlets of the spraying system. In other examples, the volume of liquid that flows out of the pump is a function of the volume of liquid that is output from the spraying outlets. For instance, a spraying system may include a recycling system such that half of the volume of liquid that flows from the pump is recycled back to the fluid reservoir while half to the volume of liquid that flows from the pump flows through the spraying apparatus and out the spraying outlets. In further examples, some of the liquid that flows out of the pump may leak or evaporate prior to being output from the spraying outlets, and this loss of liquid may be modeled in calculation of volume that is output from the spraying system. Accordingly, an amount of liquid that is output during each pump cycle from the spraying system, which includes the pump and the spraying apparatus, may be determined.

Once the amount of liquid that is output during each pump cycle is determined, the number of pump cycles that occur within a given amount of time may be measured to determine liquid flow in the spraying system. The number of pump cycles may be measured using an electronic speed controller (ESC). In particular, the ESC may indicate the number of pump cycles within a given amount of time within a threshold of precision. Based on the amount of liquid that is output during each pump cycle and the number of pump cycles as measured during a period of time, the liquid flow in the spraying system may be calculated. In particular, the liquid flow in the spraying system may be calculated based on the measured number of pump cycles and the determined amount of liquid that is output from the spraying system during a pump cycle.

The liquid flow in a spraying system may be determined based on an assessment of a pump that operates at a constant speed. In this example, the liquid flow through the spraying system may also be constant. In other examples, however, the liquid flow may be determined based on an assessment of a pump that operates at variable speed. The pump speed may be variable in a predictable manner. The pump speed may be variable in a dynamic manner. The pump speed may be variable in a periodic manner. The pump speed may be variable in a controlled manner. The pump speed may be variable in an uncontrolled manner. In a pump that operates at a variable speed, the speed of the pump may be continually assessed so as to determine the speed of the pump at any given time. This assessed speed may then be associated with the liquid flow through the spraying system.

The pump, in turn, is operably coupled to a spraying apparatus such that the liquid flow out of the pump is transmitted through the spraying apparatus and out of the spraying outlets. In examples, the liquid flow out of the pump equals to the liquid flow that is output from the spraying outlets. In other examples, the liquid flow out of the pump is a function of the liquid flow that is output from the spraying outlets. For instance, some of the liquid that flows out of the pump may leak or evaporate prior to being output from the spraying outlets, and this loss of liquid may be modeled in calculation of liquid flow that is output from the spraying system. Accordingly, an amount of liquid flow that is output from the spraying system based on the pump operating at a given speed may be determined. As a pump operates at a faster speed, a higher liquid flow may be output from the spraying system. As the pump operates at a slower speed, a lower liquid flow may be output from the spraying system.

In additional examples, the liquid flow in a spraying system may be determined based on an assessment of a pump having a variable speed. The pump speed may be variable in a predictable manner. The pump speed may be variable in a dynamic manner. The pump speed may be variable in a controlled manner. The pump speed may be variable in an uncontrolled manner. In a pump having a variable speed, the speed of the pump may be continually assessed so as to determine the speed of the pump at any given time. This assessed speed may then be associated with a volume of liquid that flows through the pump in a given amount of time. Additionally, the pump is operably coupled to the spraying system such that the volume of liquid that flows out of the pump flows into the spraying system. As such, the amount of liquid that flows into the spraying system is determined as the amount of liquid that flows out from the pump equals the amount of liquid that flows into the spraying system. Alternatively, the amount of liquid that flows into the spraying system may be determined as a function of the amount of liquid that flows out of the pump. For example, the amount of liquid that flows into the spraying system may be half of the amount of liquid that flows out of the pump. In both of these examples, the amount of liquid that flows into the spraying system is based on the amount of liquid that flows from the pump. Additionally, the amount of liquid that flows into the spraying system may be used to determine the amount of liquid that flows out of the spraying system when the spraying system is a symmetric system. Alternatively, the amount of liquid that flows out of the spraying system may be a function of the amount of liquid that flows into the spraying system, such as if a percentage of the liquid that flows into the spraying system evaporates, leaks, or otherwise leaves the spraying system in a manner other than through outlets of the spraying system.

Figure 5:
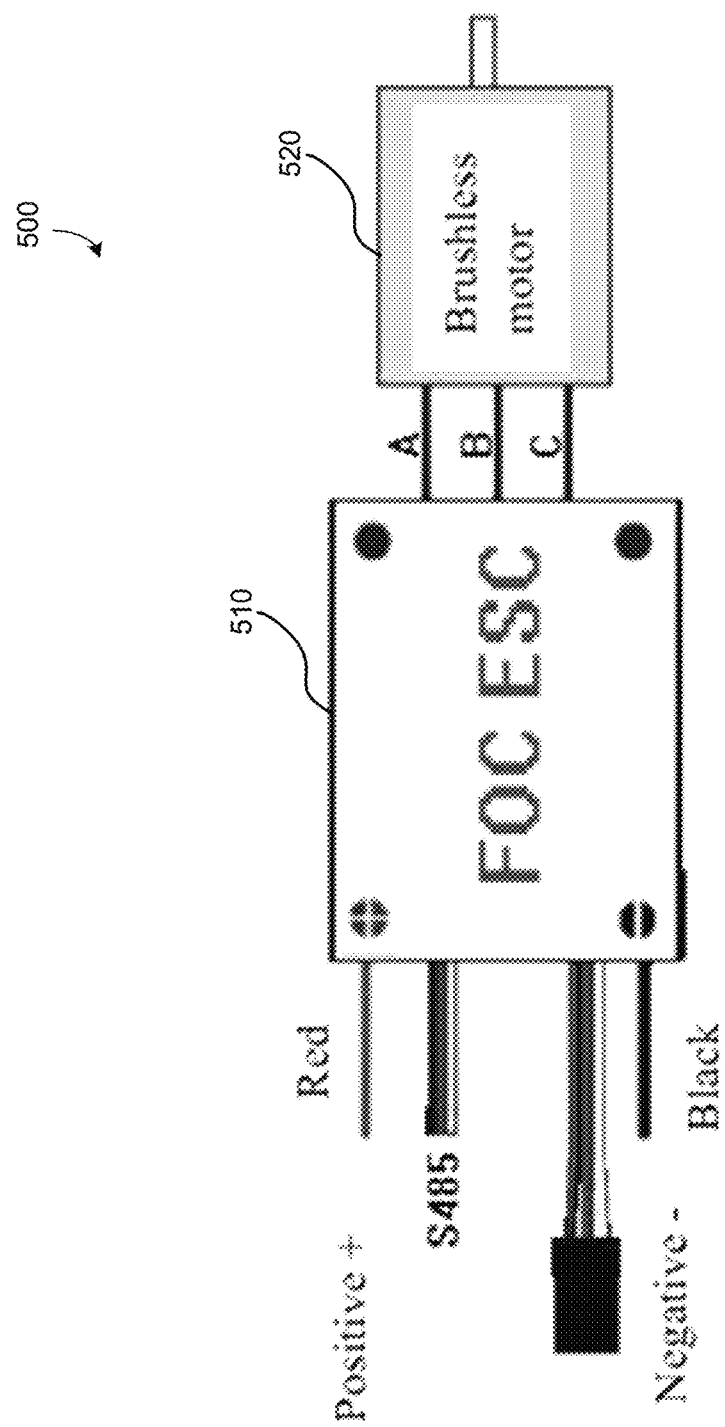
FIG. 5 illustrates a schematic of a field orient control electronic speed controller, in accordance with embodiments of the invention.

FIG. 5 illustrates a schematic 500 of a field oriented control electronic speed controller 510 to control a brushless motor 520, in accordance with embodiments of the invention. In particular, a field oriented control may identify the three stator currents used in a brushless motor as two orthogonal components: torque and magnetic flux. These two components may allow the three-component system to be analyzed using vectors.

Figure 6:
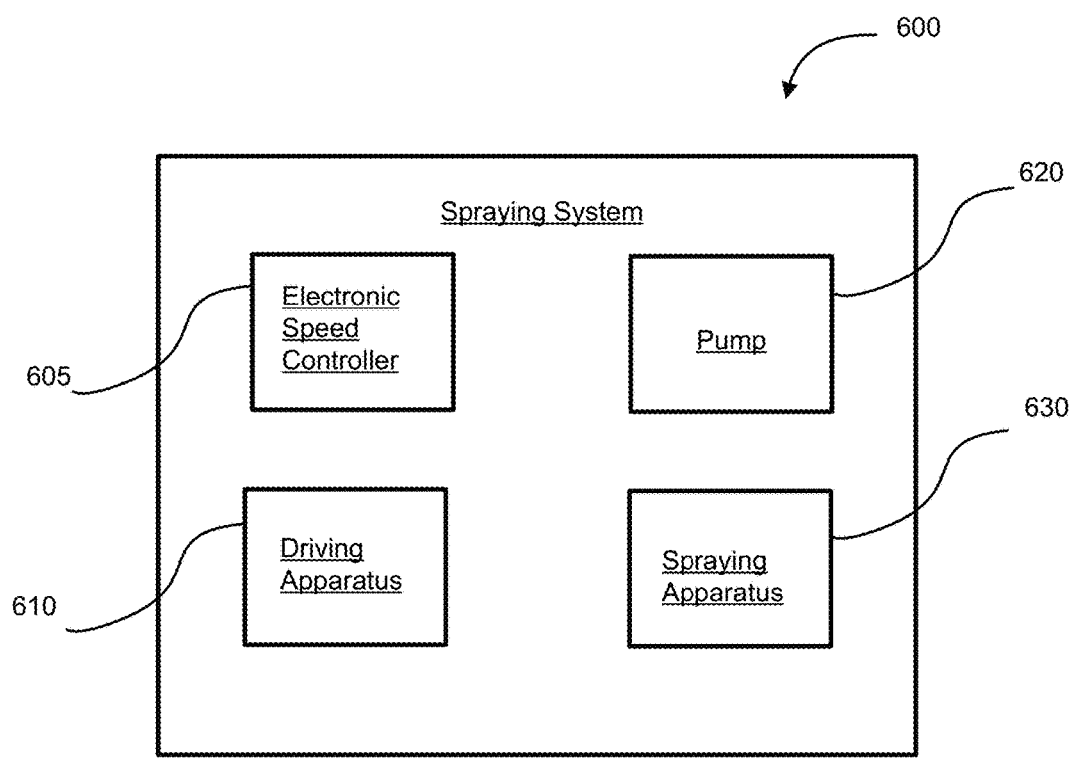
FIG. 6 illustrates a schematic of a spraying system having a spraying apparatus, an electronic speed controller, a driving apparatus, and a pump, in accordance with embodiments of the invention.

FIG. 6 illustrates a schematic of a spraying system 600 having an electronic speed controller 605, a driving apparatus 610, a pump 620, and a spraying apparatus 630, in accordance with embodiments of the invention. One or more components of the spraying system may be united in a single unit or the one or more components may be united. One or more components of the spraying system may be provided together or the one or more components may be provided separately across different parts of an unmanned aerial vehicle (UAV). Additionally, the spraying system may be positioned within a landing stand when the UAV is on the ground.

The spraying system may be attached to the UAV. The spraying system may be externally attached to the UAV. Alternatively, the spraying system may be within a housing of the UAV. In particular, the spraying system may be within a UAV. Alternatively, the spraying system may be within a holder. A holder may comprise a portable or hand-held apparatus that is adapted to hold a spraying apparatus. For example, the holder may be a bag, a backpack, or another form of carrying device or vehicle. In examples, the driving apparatus and pump may be exposed to an external environment. In examples, the spraying system may be exposed to an external environment. In other examples, one or more components of the spraying system may be exposed to an external environment.

Fluid within the fluid reservoir may be moved through the spraying apparatus using a pump. The pump may be a device that moves a material, medium, and/or product, such as agricultural material, medium, and/or product, by mechanical action. The pump may be a fluid pump that may move a liquid, gas, powder, or slurry by way of mechanical action. The pump may be a diaphragm pump, a pressure-based pump, a hydraulic pump, or another type of pump. During operation of the pump, pressure within the pump may build to a point where the spraying material, such as fluid from the fluid reservoir, may be expelled. Spraying material may be expelled as a result of positive pressure that is created using a pump. Spraying material may be a result of pressure from a pressurized reservoir. The spraying of material may be aided by the use of gravity. In examples, spraying material may be expelled using one or more mechanical features that push or distribute the material out.

An example of a pump that is used to expel material is seen in a diaphragm pump, which expands to hold material in a chamber before expelling the material. Accordingly, in examples, the pump may comprise a diaphragm pump. In particular, a diaphragm pump may be a volumetric pump that changes volume by reciprocating deformation of a diaphragm. Further, the pump may be an electric mini-diaphragm pump. Using an electric mini-diaphragm pump may significantly reduce the weight of a spraying system. Alternative pumps may also be used to effect the intake, transmittal, and expulsion of spraying material. In examples, a pump may comprise a pressure-based pump. In examples, a pump may comprise a hydraulic pump. In examples, the pump may comprise a piston pump. In examples, the pump may comprise a centrifuge pump.

The pump may have a volume of 1 cm$^3$, 2 cm$^3$, 5 cm$^3$, 10 cm$^3$, 15 cm$^3$, 20 cm$^3$, 25 cm$^3$, 30 cm$^3$, 35 cm$^3$, 40 cm$^3$, 45 cm$^3$, 50 cm$^3$, or greater than 50 cm$^3$. The pump may have a weight of 0.01 kg, 0.05 kg, 0.1 kg, 0.2 kg, 0.3 kg, 0.4 kg, 0.5 kg, 0.6 kg, 0.7 kg, 0.8 kg, 0.9 kg, 1 kg, 1.5 kg, 2 kg, 3 kg, 4 kg, 5 kg, or more than 5 kg. Additionally, the pump may have a footprint of 1 cm$^2$, 2 cm$^2$, 5 cm$^2$, 10 cm$^2$, 15 cm$^2$, 20 cm$^2$, 25 cm$^2$, 30 cm$^2$, 35 cm$^2$, 40 cm$^2$, 45 cm$^2$, 50 cm$^2$, or greater than 50 cm$^2$. The pump may have a flow of 0.01 mL/min, 0.02 mL/min, 0.03 mL/min, 0.04 mL/min, 0.05 mL/min, 0.1 mL/min, 0.2 mL/min, 0.3 mL/min, 0.4 mL/min, 0.5 mL/min, 0.6 mL/min, 0.7 mL/min, 0.8 mL/min, 0.9 mL/min, 1 mL/min, 10 mL/min, 20 mL/min, 30 mL/min, 40 mL/min, 50 mL/min, 60 mL/min, 70 mL/min, 80 mL/min, 90 mL/min, 0.01 L/min, 0.2 L/min, 0.3 L/min, 0.4 L/min, 0.5 L/min, 1 L/min, 2 L/min, 3 L/min, or greater than 3 L/min.

The driving apparatus may be operatively connected to the pump. In particular, the driving apparatus may be physically coupled to the pump. Alternatively, the driving apparatus may be physically coupled to another component that is physically coupled to the pump. The driving apparatus may be directly or indirectly connected to the pump. The driving apparatus may be a motor. In particular, the driving apparatus may be a brush direct current motor, a brushless direct current motor, an alternating current induction motor, a permanent magnet synchronous motor, or another type of motor.

The driving apparatus may operate to effect the operation of the pump. The driving apparatus may be operatively connected to the pump such that rotational energy produced by the driving apparatus is received at the pump. In particular, the rotational energy that is generated by the driving apparatus may be transmitted to the pump using a motor shaft. The rotational energy produced by the driving apparatus may be received at an offset piece of a pump. The offset piece of the pump may be a part of a piston assembly within the pump such that rotational energy that is received at the offset piece from the driving apparatus is used to engage the piston assembly of the pump. When the driving apparatus is initiated, the pump may also be initiated. In particular, the movement of the piston may cause the diaphragm of a diaphragm pump to expand so as to take in fluid. When the driving apparatus is accelerated, the pump may be accelerated.

A proportional relationship may be provided between speed of the driving apparatus and speed of the pump. A directly linear proportional relationship may be provided. As such, a relationship exists between rotational energy that is generated by a driving apparatus and pump cycles that are generated at the pump. This relationship may be used to determine liquid flow within a spraying system. However, the system can determine the characteristics of the operation of the components within a spraying system so as to calculate the flow, e.g. a liquid flow, within a desired threshold of precision.

The driving apparatus and the pump may be able to operably disconnect such that the shutdown of the driving apparatus does not necessarily shutdown the pump. For example, if the driving apparatus shuts down, the pump may have a back-up driving apparatus such as a generator. Further, the spraying system may have settings where the pump is securely coupled to the driving apparatus, such that the halting of the driving apparatus necessarily halts a pump that is securely coupled to the driving apparatus. Additionally, the pump system may have settings where the pump is decouplable from the driving apparatus. When the pump is decouplable from the driving apparatus, the pump may be switched to a secondary driving apparatus if the first driving apparatus fails or stops suddenly.

In examples, the driving apparatus and the pump may form a single unit. The driving apparatus and pump may form a single unit by sharing a common housing. The driving apparatus and pump may be inseparable from one another. The driving apparatus and pump may share one or more components in common. The single unit may form a small unit. The single unit may have a volume of 2 cm$^3$, 5 cm$^3$, 10 cm$^3$, 15 cm$^3$, 20 cm$^3$, 25 cm$^3$, 30 cm$^3$, 35 cm$^3$, 40 cm$^3$, 45 cm$^3$, 50 cm$^3$, or greater than 50 cm$^3$. The single unit may have a weight of 0.01 kg, 0.05 kg, 0.1 kg, 0.2 kg, 0.3 kg, 0.4 kg, 0.5 kg, 0.6 kg, 0.7 kg, 0.8 kg, 0.9 kg, 1 kg, 1.5 kg, 2 kg, 3 kg, 4 kg, 5 kg, or more than 5 kg.

In examples, the driving apparatus of the spraying system may take advantage of a motor. In particular, the driving apparatus may comprise a brushless motor. The brushless motor may comprise a type of electric motor that doesn't require a commutator. Examples of types of brushless motors may include brushless direct current motor, an alternating current induction motor, a permanent magnet synchronous motor. Additionally, by using a brushless motor rather than a brush motor, the weight of the spraying system may be greatly reduced. For instance, the weight of the spraying system may be reduced by 50%. The reduction of the weight may permit a UAV a longer flight time and an increased range when the UAV is carrying a reduced-weight spraying system. When a brushless motor is used in a spraying system, the overall volume of the spraying system may also be smaller. As such, spraying systems that utilize a brushless motor may be more compact and easier to fit within carrying holders. A holder may comprise a portable or hand-held apparatus that is adapted to hold a spraying apparatus. For example, the holder may be a bag, a backpack, or another form of carrying device or vehicle. In examples, the driving apparatus and pump may be exposed to an external environment.

The pump in the spraying system may be used to transmit material from a reservoir and provide that material to one or more outlets of the spraying system. Material from the reservoir may include liquids, such as pesticides, fertilizer, and water. Materials in the reservoir may be pressurized. Alternatively, materials from the reservoir may not be pressurized. Material from the reservoir may include powder, such as fire extinguishing powder. The pump may be connected to a reservoir such that engaging the pump forms a vacuum at the fluid reservoir, which draws spraying material into the pump. The spraying material may then be transmitted through the pump to one or more outlets of the spraying system.

During operation of the pump, pressure within the pump may build to a point where the spraying material may be expelled. An example of this is seen in a diaphragm pump, which expands to hold material in a chamber before expelling the mater. Accordingly, in examples, the pump may comprise a diaphragm pump. In particular, a diaphragm pump may be a volumetric pump that changes volume by reciprocating deformation of a diaphragm. Further, the pump may be an electric mini-diaphragm pump. Using an electric mini-diaphragm pump may significantly reduce the weight of a pumping system. Alternative pumps may also be used to effect the intake, transmittal, and expulsion of spraying material. In other examples, a pump may comprise a pressure-based pump or a hydraulic pump.

A spraying system may spray materials at an angle with respect to a vertical. For example, the spraying system may spray materials at an angle of 1°, 2°, 3°, 4°, 5°, 10°, 15°, 20°, 25°, 30°, 35°, 40°, 45°, 50°, 55°, 60°, 65°, 70°, 75°, 80°, 85°, 90°, 95°, 100°, 105°, 110°, 115°, 120°, 125°, 130°, 135°, 140°, 145°, 150°, 155°, 160°, 165°, 170°, 175°, 180°, or more than 180° from with respect to the vertical in either direction. Additionally, material that is sprayed may be sprayed in a stream of varying width. In particular, the width of a spray stream may be 0.01 cm, 0.05 cm, 0.1 cm, 0.2 cm, 0.3 cm, 0.4 cm, 0.5 cm, 0.6 cm, 0.7 cm, 0.8 cm, 0.9 cm, 1 cm, 2 cm, 3 cm, 4 cm, 5 cm, 6 cm, 7 cm, 8 cm, 9 cm, 10 cm, 15 cm, 20 cm, 25 cm, 50 cm, 1 m, 5 m, 10 m, 20 m, or greater than 20 m. Further, the material that is sprayed may be sprayed with a force of 0.01 N, 0.05 N, 0.1 N, 0.2 N, 0.3 N, 0.4 N, 0.5 N, 0.6 N, 0.7 N, 0.8 N, 0.9 N, 1 N, 2 N, 3 N, 4 N, 5 N, 6 N, 7 N, 8 N, 9 N, 10 N, 15 N, 20 N, 25 N, 50 N, or greater than 50 N. Additionally, a spraying system can cover a large area of land. Depending on the height of the spraying apparatus from its target, the spraying apparatus may spray a land area of 1 $cm^2$, 2 $cm^2$, 5 $cm^2$, 10 $cm^2$, 15 $cm^2$, 20 $cm^2$, 25 $cm^2$, 30 $cm^2$, 35 $cm^2$, 40 $cm^2$, 45 $cm^2$, 50 $cm^2$, 75 $cm^2$, 1 $m^2$, 2 $m^2$, 3 $m^2$, 5 $m^2$, 10 $m^2$, 20 $m^2$, 50 $m^2$, 100 $m^2$, 200 $m^2$, 300 $m^2$, 500 $m^2$, or greater than 500 $m^2$.

A spraying apparatus may be used for distributing fluids that are processed using the spraying system. In particular, the spraying apparatus may be used for spraying pesticides or fertilizer. Spraying systems that include a spraying apparatus may be used by individuals spraying pesticides or fertilizer in a field. In particular, the spraying system may be coupled with the spraying apparatus within a holder which may then be carried by a farmer who is tending to his field. A holder may comprise a portable or hand-held apparatus that is adapted to hold a spraying apparatus. For example, the holder may be a bag, a backpack, or another form of carrying device or vehicle. In examples, the driving apparatus and pump may be exposed to an external environment. Alternatively, spraying systems that include a spraying apparatus may be used in an agricultural unmanned aerial vehicle (UAV) for pumping out pesticides or fertilizer from the spraying apparatus.

The spraying apparatus may include a fluid reservoir, one or more spraying outlets, and an assembly for controlling flow of fluid from the fluid reservoir to the one or more spraying outlets. The one or more outlets may be nozzles. In examples of the spraying system, a pump may transmit fluid from the fluid reservoir of the spraying apparatus to nozzles of the spraying apparatus. The fluid may include a liquid or a gaseous fluid. In some embodiments, the fluid may include particles therein. For instance, the gaseous fluid may include powder or other particles that may be with the gaseous fluid. Any description herein of fluid handled by the spraying system may also apply to any particulates, powders, or other solid substances that may be handled by the spraying system. The spraying apparatus may also be used to spray fertilizer, seeds, or powders. In examples, the spraying apparatus may be a pesticide spraying apparatus.

Additionally, an electronic speed controller may be attached to the spraying system. The electronic speed controller may be within the spraying system. The electronic speed controller may be within a housing that contains the spraying system. The electronic speed controller may be affixed to an interior cavity of a housing that contains the spraying system. The electronic speed controller may be attached to an exterior of a housing that contains the spraying system. In examples where the spraying system is within an unmanned aerial vehicle (UAV), the electronic speed controller may be attached to the interior of the UAV. Alternatively, the electronic speed controller may be attached to the exterior of the UAV. The electronic speed controller may be permanently affixed to the UAV. The electronic speed controller may be detachably affixed to the UAV.

The electronic speed controller may operate with aid of a power source of the electronic speed controller. The power source of the electronic speed controller may or may not be the same as a power source that powers the spraying system. The power source of the electronic speed controller may or may not be the same as a power source that powers the one or more propulsion units of a UAV having a housing that contains the spraying system. The power source of the electronic speed controller may or may not be the same as a power source that powers one or more electrical components of the UAV. The power source of the electronic speed controller may be provided within a housing of the spraying system. The power source of the electronic speed controller may be provided within a housing of the UAV. The power source of the spraying system may alternatively be provided outside the housing of the UAV.

Different types of electronic speed controllers may be used to control the spraying system. For instance, an electronic speed controller that is a field oriented control may be used to control a driving apparatus of the spraying system. In particular, an FOC may be used to as a type of electronic speed controller that measures operating characteristics of a motor, such as torque and magnetic flux of the motor, and uses the characteristics to provide control to the motor.

The electronic speed controller may be attached to the driving apparatus. Alternatively, the electronic speed controller may be attached to the pump. In other examples, the electronic speed controller may be separate from the driving apparatus and the pump. For example, when the spraying system is within a UAV, the electronic speed controller may be mounted to the UAV. In particular, the electronic speed controller may be within the UAV. In examples, the electronic speed controller may be attached to the UAV.

Figure 7:
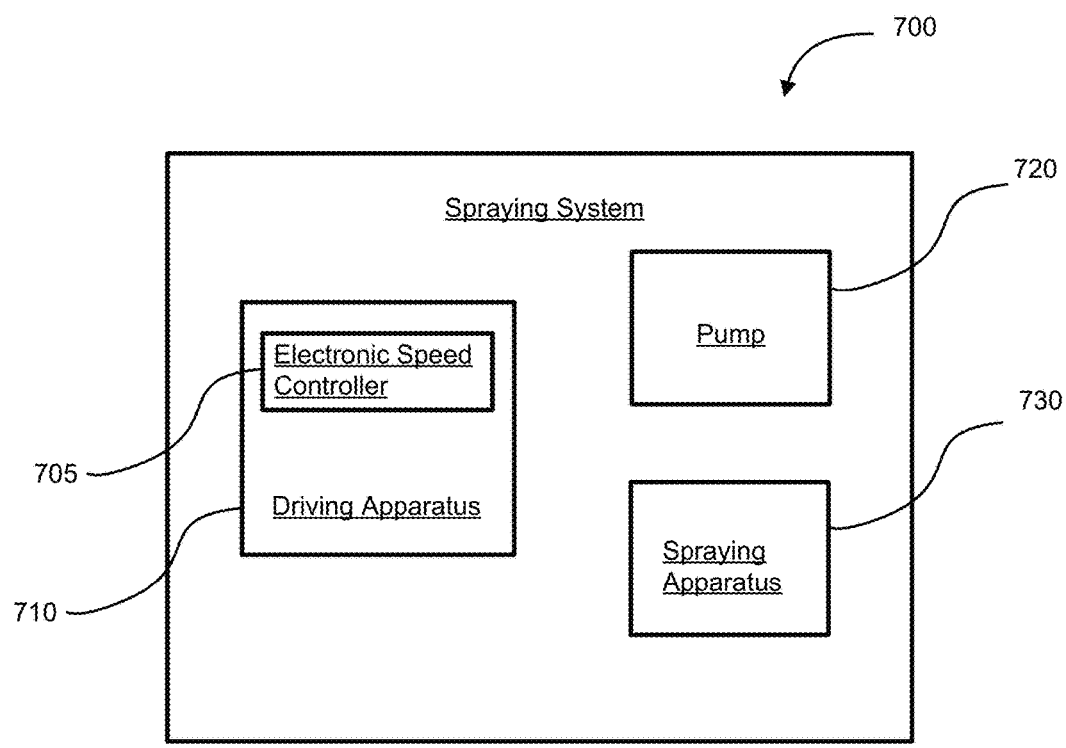
FIG. 7 illustrates a schematic of a spraying system having a spraying apparatus, a driving apparatus with an integrated electronic speed controller, and a pump, in accordance with embodiments of the invention.

In examples, an electronic speed controller may be integrated within a driving apparatus of a spraying system. FIG. 7 illustrates a schematic of a spraying system 700 having a spraying apparatus 730, a driving apparatus 710 with an integrated electronic speed controller 705, and a pump 720, in accordance with embodiments of the invention. The electronic speed controller may be attached to the driving apparatus. The electronic speed controller may be within the driving apparatus. The electronic speed controller may be within a housing of the driving apparatus. The electronic speed controller may be attached to the exterior of the driving apparatus. The electronic speed controller may be constructed as a part of (or permanently affixed to) the driving apparatus. The electronic speed controller may be detachably affixed to the driving apparatus.

The electronic speed controller may operate with aid of a power source of the electronic speed controller. The power source of the electronic speed controller may or may not be the same as a power source that powers the driving apparatus. The power source of the electronic speed controller may or may not be the same as a power source that powers the one or more propulsion units of the UAV. The power source of the electronic speed controller may or may not be the same as a power source that powers one or more electrical components of the UAV. The power source of the electronic speed controller may be provided within a housing of the driving apparatus. The power source of the electronic speed controller may be provided within a housing of the UAV. The power source of the spraying system may alternatively be provided outside the housing of the UAV.

The use of an integrated electronic speed controller within a driving apparatus may be a benefit when customizing a driving apparatus for use in a spraying system. In particular, integrating the electronic speed controller within a particular driving apparatus may be used to ensure compatibility between the driving apparatus and the electronic speed controller. This internal compatibility may be useful when a type of the driving apparatus within a spraying system is exchanged for another type of driving apparatus that is integrated with another electronic speed controller that is compatible.

Figure 8:
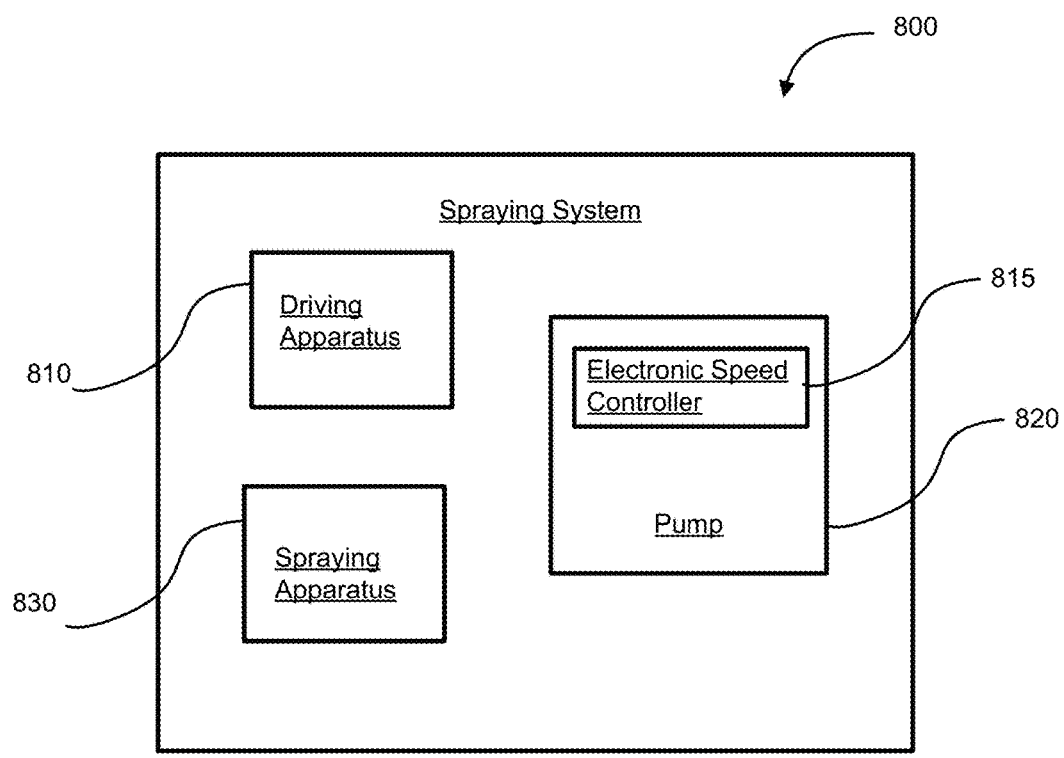
FIG. 8 illustrates a schematic of a spraying system having a spraying apparatus, a driving apparatus, and a pump with an integrated electronic speed controller, in accordance with embodiments of the invention.

In other examples, an electronic speed controller may be integrated within a pump of a spraying system. Accordingly, FIG. 8 illustrates a schematic of a spraying system 800 having a spraying apparatus 830, a driving apparatus 810, and a pump 820 with an integrated electronic speed controller 815, in accordance with embodiments of the invention. The electronic speed controller may be attached to the pump. The electronic speed controller may be within the pump. The electronic speed controller may be within a housing of the pump. The electronic speed controller may attached to the exterior of the pump. The electronic speed controller permanently affixed to the pump. The electronic speed controller may be detachably affixed to the pump.

The electronic speed controller may operate with aid of a power source of the electronic speed controller. The power source of the electronic speed controller may or may not be the same as a power source that powers the pump. The power source of the electronic speed controller may or may not be the same as a power source that powers the one or more propulsion units of the UAV. The power source of the electronic speed controller may or may not be the same as a power source that powers one or more electrical components of the UAV. The power source of the electronic speed controller may be provided within a housing of the pump. The power source of the electronic speed controller may be provided within a housing of the UAV. The power source of the spraying system may alternatively be provided outside the housing of the UAV.

The electronic speed controller may control the pump. In particular, the electronic speed controller may control a volume of liquid that is pumped through the pump. For example, when the pump is coupled with a spraying apparatus, the amount of spraying liquid that flows through the spraying system may be precisely controlled using an electronic speed controller. Additionally, the electronic speed controller may control a pressure of liquid that is pumped through the pump. In this way, the flow response within a pump may be easily adjusted using the electronic speed controller and may be adjusted with a fast response time. In particular, the flow response within a pump may be adjusted independent of the type of electronic speed controller that is used to measure flux.

Figure 9:
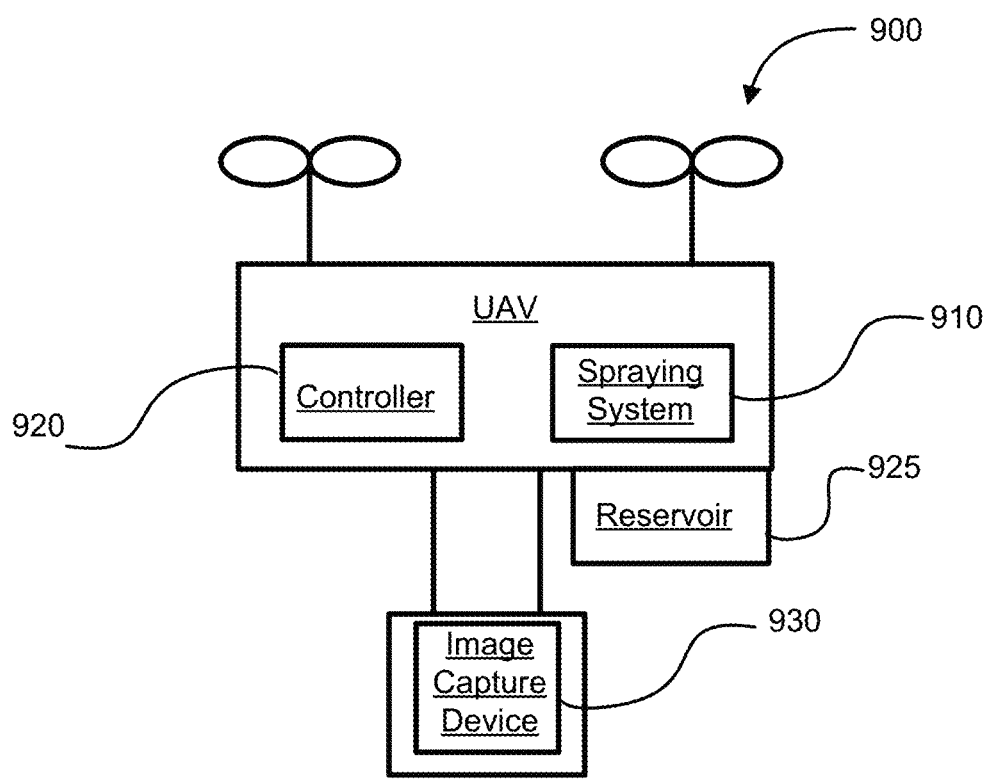
FIG. 9 illustrates a schematic of a UAV having a spraying system, in accordance with embodiments of the invention.

FIG. 9 illustrates a schematic of a UAV 900 having a spraying system 910, in accordance with embodiments of the invention. Additionally, the spraying system may have a pump (not shown) that is operatively coupled to a fluid reservoir. Accordingly, FIG. 9 illustrates a fluid reservoir 925 that is a payload of the UAV. A fluid reservoir may be attached externally to the UAV. In particular, the fluid reservoir may be attached to an external portion of a housing of the UAV. Alternatively, the fluid reservoir may be partially within the UAV and may partial extend outside of the UAV. Additionally, the fluid reservoir may be communicatively coupled to a pump. The pump may be used to obtain fluid from the fluid reservoir and provide the fluid to spray outlets of the spraying system. Different portion(s) of the spraying system (e.g., fluid reservoir, pump, spray outlets) may be provided between landing stands of the UAV when the UAV is in a landed state, or when the UAV is in a flying state. Different portion(s) of the spraying system may be within or below the central body of the UAV. Any portion of the spraying system may or may not be stabilized using a carrier, such as a gimbal system. In some embodiments, some spraying system may be stabilized while other portions are not stabilized.

The use of a spraying system and a controller 920 within agricultural UAVs allows for spraying operations to be controlled by an external device. The UAV may have an on-board controller 920 that may effect operations of the spraying system. The on-board controller may receive communications (directly or indirectly) that have been provided by an external device. The external device may be any object that may be communicating with the UAV. For instance, the external device may be a remote controller (e.g., remote terminal) that may receive a user input to effect operation of the UAV. The remote controller may provide signals that may effect operations of the spraying system. The remote controller may provide signals that may effect flight of the UAV. The remote controller may provide signals that may effect communications of the UAV. The remote controller may provide signals that may effect operation of a payload of the UAV, which may include a component of the spraying system, an imaging device, any type of sensor, or any type of emitter. The remote controller may affect a power state of the payload, positioning of the payload relative to the UAV central body (e.g., spatial disposition and/or orientation). The remote controller may be a handheld device, wearable device, or may be any other type of device capable of interaction with the user.

Another example of an external device may be a ground station (i.e. ground remote controller). In particular, the controller may receive information and/or instructions from ground stations, which may be connected to a remote server or servers with analytics information. The ground station may or may not receive a user input. The ground station may be capable of operating independently of a manual user input. The ground station may be substantially stationary (e.g., incapable of self-propulsion) or may be mobile (e.g., capable of self propulsion, such as a vehicle). The ground station may be capable of effecting operation of the UAV and/or any component carried by the UAV, such as operations described with respect to the remote controller. For instance, the ground station may supply information that may affect operation of the spraying system of the UAV. The ground station may or may not be capable of permitting a UAV to land on the ground station. The ground station may be capable of accepting a payload, such as a package, from the UAV. The ground station may be capable of providing a payload, such as a package, to the UAV. The ground station may be capable of providing energy to the UAV. For instance, the ground station may recharge a power unit (e.g., battery) of the UAV. The power unit may be recharged while the power unit is on-board the UAV or may be recharged after the power unit has been removed from the UAV. The ground station may be capable of swapping the power unit of the UAV for another power unit. The other power unit may be provided by the ground station and may optionally have a higher state of charge than the UAV power unit. The ground station may optionally have sensors, such as any type of sensor described elsewhere herein, that may collect information about an environment of the ground station. Examples of such environmental information may include images of the environment, audio data, temperature data, wind speed and/or direction data, detection of precipitation, detection of vibrations, detection of movement, detection of chemical signatures, or any other type of data.

Another example of an external device may be an aerial external device. The aerial external device may be another UAV. The other UAV may or may not be of the same type of UAV. The aerial external device may be a balloon, blimp, airplane, helicopter, glider, satellite, or any other type of aerial device. The external aerial device may or may not have an on-board spraying system. The external aerial device may or may not have sensors that may collect information about an environment of the external aerial device. Any type of sensors described elsewhere herein, may be provided on the external aerial device. The aerial external device may be capable of sending signals that may affect operation of the UAV and/or any component carried by the UAV, such as operations described with respect to the remote controller. For instance, the aerial external device may supply information that may affect operation of the spraying system of the UAV.

An external device may be a server or a cloud-based infrastructure that may be capable of receiving information from other sources, such as other types of external devices described herein. The external device may be able to directly or indirectly communicate with the The external device may provide any type of signal that may be directly or indirectly received by the controller 920. The external device may provide a signal that directly controls operation of the spraying system, such as instructions to turn on the spraying system, turn off the spraying system, control direction of spray, control spraying rate, control spraying outlets that may be individually turned on or off, or effect a selection of the material that is sprayed, from a plurality of material options. The spraying path or route of the UAV may also be directly controlled. In some embodiments, the direct spray control commands may be provided directly by a user, or may be determined by one or more processors of an external device. Alternatively, the external device may provide information that may aid the controller in controlling operation of the spraying system. The data from the external device may be considered by the controller, possibly in combination with additional data, to turn on the spraying system, turn off the spraying system, control direction of spray, control spraying rate, control spraying outlets that may be individually turned on or off, or effect a selection of the material that is sprayed, from a plurality of material options. The spraying path or route of the UAV may also be determined based on the information from the external device. The additional data may optionally include data from on-board the UAV, such as data described elsewhere herein. The data from the external device may include environmental information (e.g., weather information), images from around the external device, data from one or more sensors of the external device, information about operation of the external device, business information, insurance information, or agricultural information. The agricultural information may relate to types of materials, volumes of materials, timing information, or how materials should be applied to different types of agricultural products. Such agricultural information may take into account conditions under which the materials are applied (e.g., weather conditions, time of day, season, visual images about the state of the agricultural product, age or level of maturity of the agricultural product, etc.). For instance, the controller may receive agricultural information that is associated with an optimization of type of fertilizer that is provided to a particular type of crop. The agricultural information may be updated to include the latest knowledge and breakthroughs for agricultural products. The business information may include information about costs of spraying materials, types and/or yields of agricultural products (optionally, based on the materials applied), financial information associated with the agricultural products, costs of operation and/or maintenance of the spraying system and/or UAV, or any other business-related information. The business information may include financial information which includes costs, revenues, or projected profits. Insurance information may relate to information on returns for loss of crops, returns for damage to the spraying system and/or UAV, details about insurance policies, or any other insurance-related information. The data may include projections or may be used to form projections. For instance, the data may include projected environmental conditions (e.g., weather patterns) for a period of time in the future (e.g., the coming hours, days, weeks, months, etc.). The data may include data collected or generated by external sources (e.g., third parties, such as a weather system or website), that may be provided to the external device.

Information that is received at the controller of the spraying system may be used to control the operation of the spraying systems. The controller may include one or more processors that may individually or collectively effect any of the analysis described herein. The controller may receive information from any external device, such as those described herein, or any combination of external devices. For example, the controller may receive information associated with the amount of spraying materials that are ideal for crops given a particular weather condition. The analytics information may also include predicted weather patterns over the next few days or weeks. While sensors on the UAV may be used to assess present weather conditions, which may then be assessed by the spraying system, the use of analytical information that may be retrieved from an external source may allow the spraying system to operate in a way that accounts for past and future data, as well as present data that may be acquired by sensors of a UAV.

As such, spraying systems may have analytical and deductive components, making them "smart" systems. For example, a controller of the spraying system may receive information from an external device, such as a ground station, that indicates a particular crop area has been under drought for a number of weeks. However, the sensors of the UAV to which the spraying system is attached may indicate that the current weather predictions are associated with a high chance of rain. If the spraying system only had the information related to a high chance of rain, the spraying system may provide a high rate of spraying materials, such as fertilizer or pesticides, to counter the expectation that the rain would dilute the spraying material. However, if the spraying system accounts for the weeks-long history of drought, the spraying system may assess that the current ground conditions may not be ideal for providing spraying materials, as the ground may be excessively dry, and that it would be better to delay spraying the crops until after the rain has occurred. Thus, the controller may take one, two, or more types of information into account when effecting control of the spraying system, such as information generated on-board the UAV, information from an external device, and/or information pre-stored in memory on-board the UAV. The controller may take one, two, or more types of information into account when effecting control of the spraying system, such as past information (e.g., historical data), current information (e.g., information currently being collected/sensed), and/or future information (e.g., projections). The controller may take one, two, or more types of information into account when effecting control of the spraying system, such as data from external sources, sensed information, or background data from the external device(s).

Additionally, the use of a spraying system and a controller within agricultural UAVs allows for spraying operations to be controlled through the use of a global positioning service (GPS) signal. Controlling signals that are generated by the controller may be based on pulse-width modulation. Pulse-width modulation is a technique used to encode a message into a pulsing signal. For example, pulse-width modulation may be used to encode a message into a pulsing signal to output a certain amount of spraying material during each pump cycle. Alternatively, pulse-width modulation may be used to encode a message into a pulsing signal to output a spraying material in a particular direction. Additionally, pulse-width modulation may be used to encode a message into a pulsing signal to output a spraying material for a certain amount of time. Further, pulse-width modulation may be used to encode a message into a pulsing signal that indicates fluid within the pump has fallen below a certain threshold.

In generating controlling signals, the controller may incorporate and analyze information from different sensors associated with the UAV. In particular, the controller may be able to analyze information associated with a flight control of the UAV. Additionally, the controller may be able to analyze information associated with an image sensor of the UAV. Further, the controller may be able to analyze information associated with a remote server of the UAV.

The downward airflow generated by the rotors of a UAV may facilitate a penetrating of the sprayed substance to the desired target. As such, by using a UAV, to distribute sprayed substances, the spraying effect of the substances may be improved. Since the UAVs can be operated over a long distance, and since an operator may not be exposed to the pesticide, safety in using a spraying system that utilizes UAV may be improved.

The spraying system may operate while the UAV is in flight. Operation of the spraying system may include delivery of fluid from a fluid reservoir to one or more outlets of the spraying system. The spraying system may operate while the UAV is landed. The spraying system may optionally be prevented from operating while the UAV is landed. The spraying system may be able to operate only while the UAV is flight. The spraying system may automatically start operating while the UAV is in flight.

The spraying system may automatically start operating when the UAV reaches a predetermined altitude. The spraying system may start operating, or modify operation of, the spraying system based on sensed characteristics of a surrounding environment. In particular, the spraying system may spray material based on feedback received from one or more sensor, or based on measured energy/power output. Additionally, the spraying system may spray materials based on the identification of a particular target. In particular, a UAV may have target identifying capabilities that may be used to identify a target, which in turn may cause the spraying system to expel materials. A target may be identified using visual detection, GPS sensors, or other ways of determining location. Alternatively, the spraying system may operate in response to a user command to operate. The user command to operate may be delivered with aid of a remote terminal. In examples, a user command may include instructions to turn on the spraying system, turn off the spraying system, control the volume of liquid that passes through a spraying system, or control a direction of fluid that passes through a spraying system.

The UAV may also assess operating characteristics of the spraying system itself. In examples, the operation of the UAV may be affected by conditions within the spraying system. For example, if there are no more spraying materials within the spraying system, the UAV may alter its flight plan to return to its home or return to a close location to refill its spraying system with spraying materials. In particular, the UAV may return to a predetermined position when the operating characteristics of the spraying system indicate that there is no more liquid, or other form of spraying materials, to spray.

Additionally, the operation of the spraying system may be affected by the operation of the UAV. In particular, the spraying system may alter its output of spraying material based on the operation of the UAV. One operation may include the speed of the UAV, which may be measured using one or more of the sensors described above. For example, the speed of a UAV may be assessed using a GPS system, an IMU, an image capture device, an ultrasound, or other examples. As the UAV accelerates, the spraying system may increase the amount of spraying materials that are output. As the UAV decelerates, the spraying system may decrease the amount of spraying materials that are output. In other examples, when a UAV travels at a speed above a certain threshold, the spraying system may increase the amount of spraying materials that are output. When the UAV travels at a speed below a certain threshold, the spraying system may decrease the amount of spraying materials that are output. Additionally, the spraying system may have a plurality of fluid outlets. Based on the speed, acceleration, deceleration, or other factors, the spraying system may utilize a greater number of fluid outlets or a lesser number of fluid outlets of the plurality of outlets. For example, if the UAV is accelerating, the spraying system may increase the number of fluid outlets that the spraying system is using. If the UAV is decelerating, the spraying system may decrease the number of fluid outlets that the spraying system is using.

Additionally, the spraying system may alter its output of spraying material based on the flying height or altitude of the UAV. As the UAV gains altitude, the spraying system may increase the amount of spraying materials that are output. As the UAV loses altitude, the spraying system may decrease the amount of spraying materials that are output. Additionally, the spraying system may have a plurality of fluid outlets. Based on the altitude of the UAV, the spraying system may utilize a greater number of fluid outlets or a lesser number of fluid outlets of the plurality of outlets. For example, if the UAV is gaining altitude, the spraying system may increase the number of fluid outlets that the spraying system is using. If the UAV is losing altitude, the spraying system may decrease the number of fluid outlets that the spraying system is using. Further, the UAV may choose a particular selection of fluid outlets that may be associated with directionality of sprayed output. The selection of fluid outlets may be based on the desired direction of sprayed output, which in turn may be determined based on factors such as UAV speed, altitude, and geographic location. The spray pattern that is used may also be determined based on such considerations, and may include a narrow spray pattern, a wide spray pattern, or other variations.

In addition to including the spraying system, the UAV may include one or more electronic components such as a flight control module, a GPS unit, and a wireless communication module. Data that is received from the one or more electrical components may be used to affect the spraying system. In particular, information that is gathered using the flight control module may be used to alter the output of the spraying system based on the UAV flight patterns. In examples, the spraying system may cease outputting spraying materials when the UAV is taking off. Alternatively, the spraying system may cease outputting spraying materials when the UAV is landing. Additionally, information that is gathered using the GPS unit may be used to alter the output of the spraying system based on the UAV's geographic position. In examples, the spraying system may initiate spraying materials when the UAV has arrived at pre-determined geographic coordinates. Further, information that is obtained using the wireless communication module may be used to alter the output of the spraying system based on instructions received over the wireless communication module. In examples, the spraying system may initiate spraying materials in response to receiving, from the wireless communication module, instructions to initiate spraying materials. Alternatively, the spraying system may halt spraying materials in response to receiving, from the wireless communication module, instructions to halt spraying materials. In other examples, the spraying system may increase the amount of fluid that is sprayed in response to receiving, from the wireless communication module, instructions to increase the amount of spraying materials.

Additionally, the UAV may comprise a payload. The payload may include multiple parts. The payload may be an imaging device, such as an image capture device 930. The payload may be carried beneath a central body of the UAV. The payload may also be movable with respect to the central body of the UAV. Additionally, the payload may weigh at least 10 kg. In some embodiments, the payload can be a material reservoir. The payload may be the spraying system. In some instances, multiple payloads and/or types of payloads may be provided. For example, an agricultural material, medium, and/or product distribution system and a camera may be provided as payloads of a UAV.

Additionally, information that is gathered from an image capture device that is connected to the UAV may affect the operation of the spraying system. In particular, the spraying system may alter its output of spraying material based on the image data that is received by the UAV. When the UAV is spraying densely spaced agricultural crops, such as cornfields, the UAV may increase the amount of spraying material that is output. When the UAV is spraying sparsely spaced agricultural crops, such as orchards, the UAV may decrease the amount of spraying material that is output. The identification of densely spaced agricultural crops and/or sparsely spaced agricultural crops may be made by the controller based on information that is received from the image capture device. In other examples, the image capture device may gather data that is used by the controller to identify urban areas. The identification of urban areas by the controller may be used to provide the UAV with instructions to cease its output of spraying materials.

Figure 18:
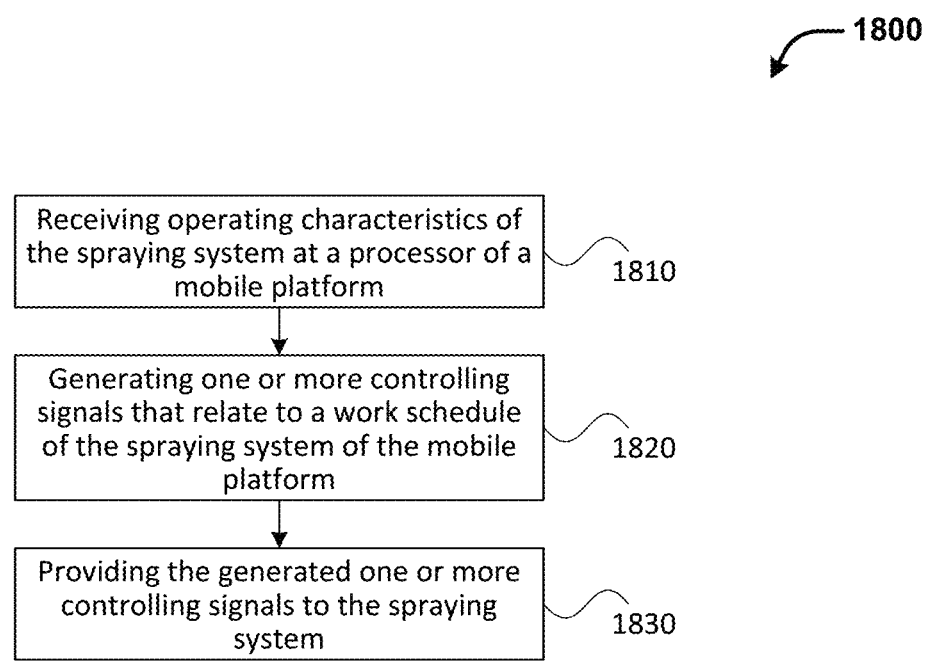
FIG. 18 illustrates a flowchart of a method of controlling a work schedule of a spraying system of a mobile platform, in accordance with embodiments of the invention.

FIG. 18 illustrates a flowchart 1800 of a method of controlling a work schedule of a spraying system of a mobile platform, in accordance with embodiments of the invention. At block 1810, operating characteristics of the spraying system are received at a processor of the mobile platform. The operating characteristics may include pump speed. The operating characteristics may include motor speed.

At block 1820, one or more controlling signals that relate to a work schedule of the spraying system of the mobile platform are generated. The one or more controlling signals may be generated based on the received operating characteristics of the spraying system. Additionally, the one or more controlling signals may be based on pulse-width modulation. The pulse-width modulation may be used to encode instructions into a pulsing signal. The pulse-width modulation may be used to encode a spraying amount for each pump cycle into a pumping signal.

At block 1830, the one or more controlling signals that are generated are provided to the spraying system. The one or more controlling signals may be used to control the spraying width of liquid that is output from the spraying system. The one or more controlling signals may be used to control the directionality of liquid that is output from the spraying system. The one or more controlling signals may be used to control the spraying time of liquid that is output from the spraying system. The one or more controlling signals may be used to determine when the working current has fallen below a threshold amount. The one or more controlling signals may be used to synchronize the work schedule of the spraying system with the flying speed of the UAV. The one or more controlling signals may be used to instruct the spraying system to increase the flux of liquid sprayed as the UAV increases in speed. The one or more controlling signals may be used to instruct the spraying system to increase the flux of liquid sprayed as the UAV increases in altitude. The one or more controlling signals may be used to instruct the spraying signal to stop spraying when the UAV is not moving.

The method of controlling a work schedule of a spraying system of a mobile platform may further comprise determining that the working current has fallen below a threshold amount. Additionally, the method of controlling a work schedule of a spraying system of a mobile platform may further comprise engaging an alarm to indicate that fluid within the pump has fallen below a threshold amount.

Figure 10:
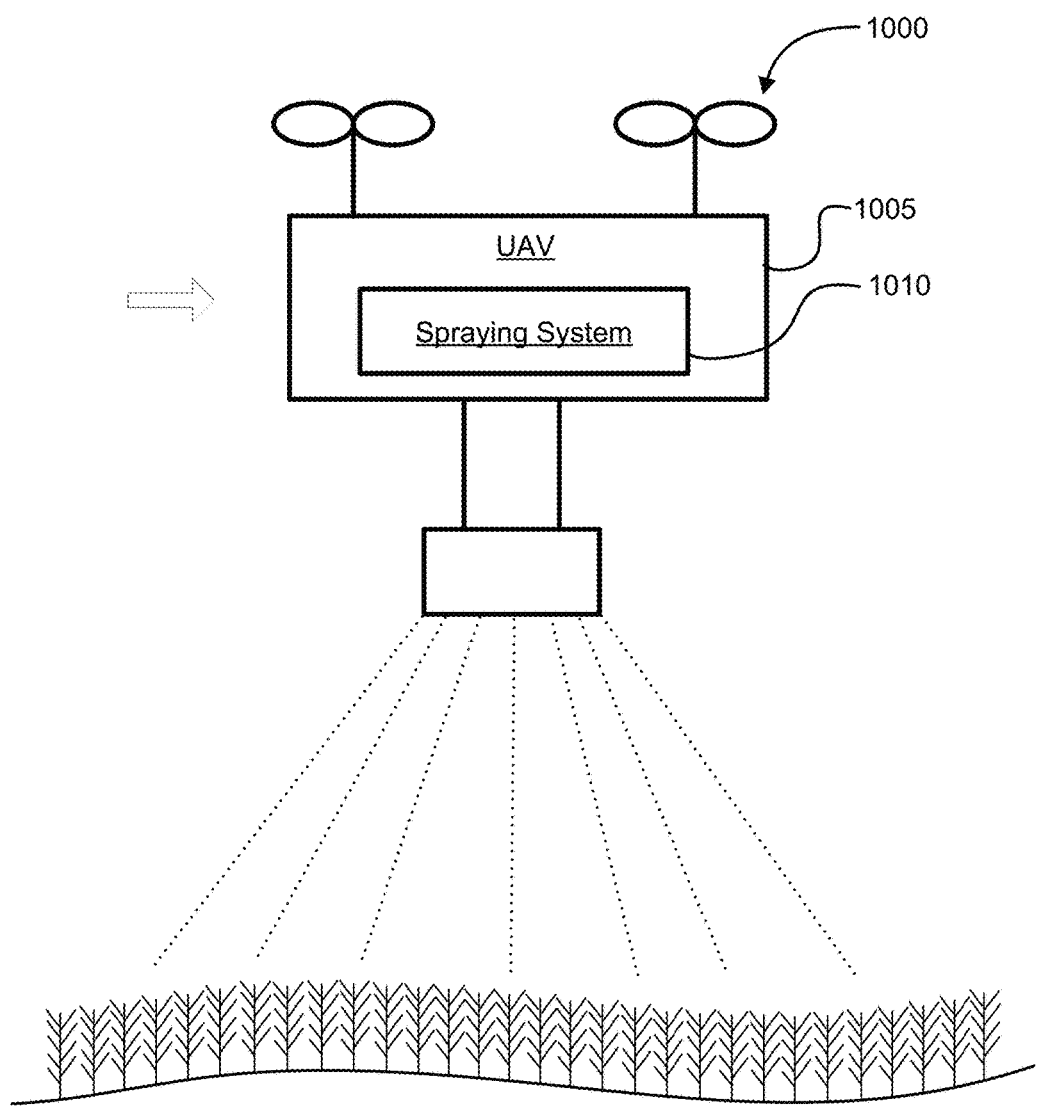
FIG. 10 illustrates a UAV with a spraying apparatus spraying a field at a first speed, in accordance with embodiments of the invention.

As discussed above, spraying systems that utilize efficient pumps as discussed herein may be carried on agricultural UAVs to spray materials, such as pesticides or fertilizers, onto crops. Accordingly, FIG. 10 illustrates a UAV 1000 with a spraying system 1010 spraying a field at a first speed, in accordance with embodiments of the invention. The spraying system may be within a housing 1005 of the UAV. Alternatively, the spraying system may be mounted to the UAV as a payload. Additionally, the operation of the spraying system may be affected by the operation of the UAV.

Figure 11:
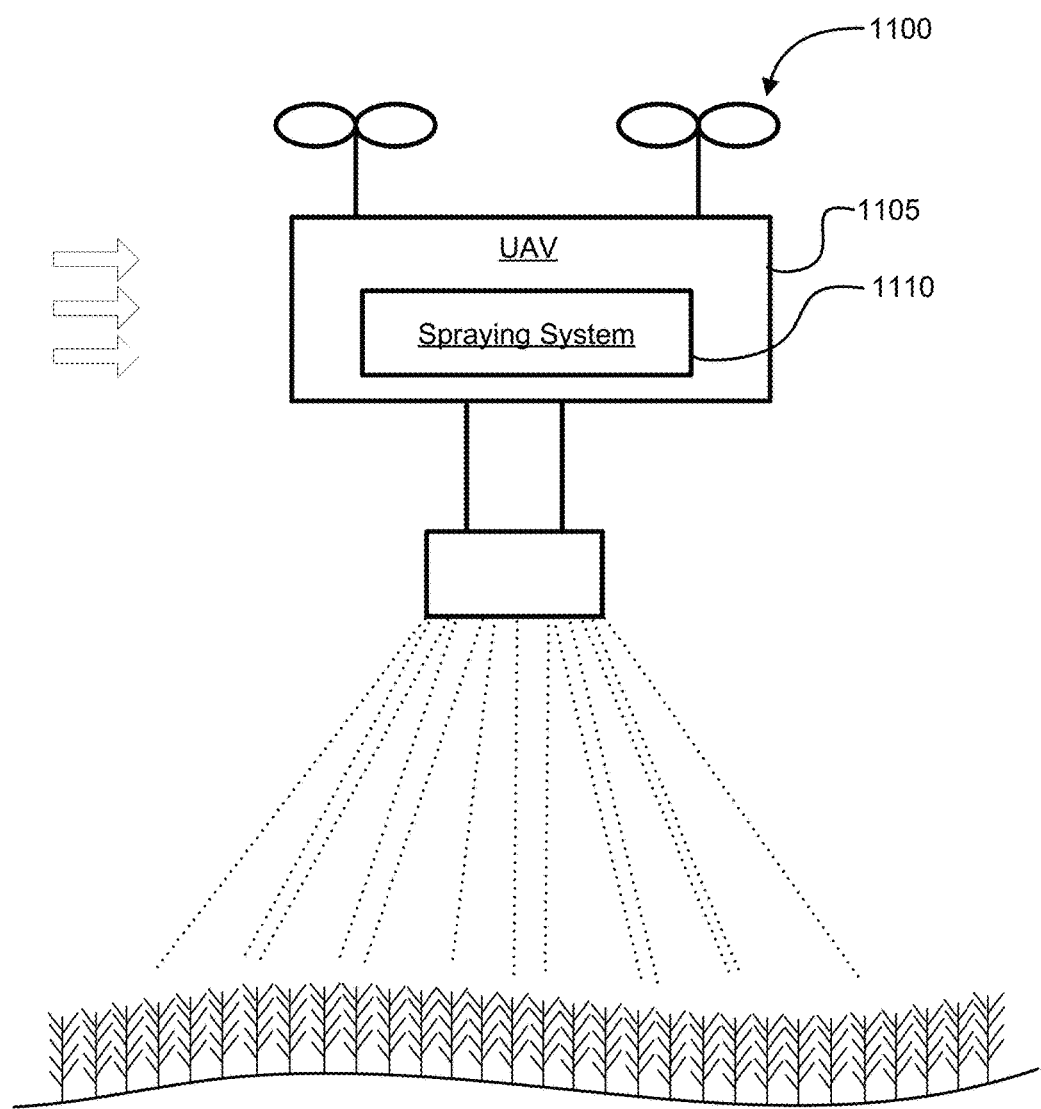
FIG. 11 illustrates a UAV with a spraying apparatus spraying a field at a second speed, in accordance with embodiments of the invention.
Figure 12:
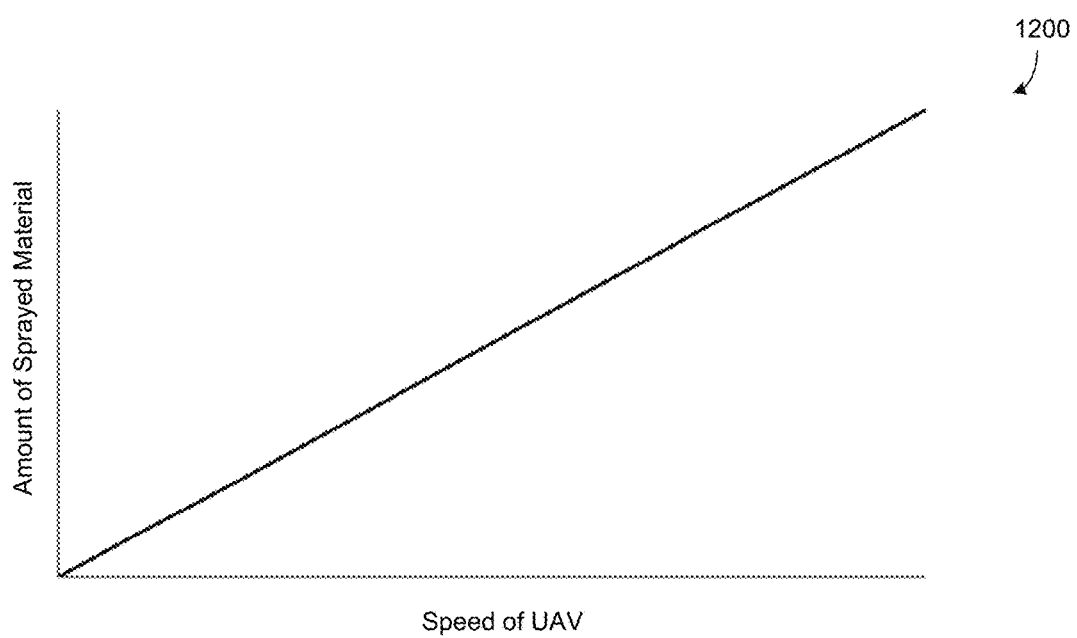
FIG. 12 illustrates a relationship between speed of a UAV and amount of fluid sprayed from a spraying system, in accordance with embodiments of the invention.

In particular, the spraying system may alter its output of spraying material based on the operation of the UAV. This is shown in FIG. 11 illustrates a UAV 1100 with a spraying system 1110 within a housing 1105 of the UAV. Spraying system 1110 is spraying a field at a second speed, in accordance with embodiments of the invention. Comparing FIG. 10 to FIG. 11, the increase of speed between FIGS. 10 and 11 is represented with an increased number of directional arrows. Additionally, the amount of material that is sprayed also increases between FIGS. 10 and 11. Additionally, FIG. 12 illustrates a relationship between speed of a UAV and amount of fluid sprayed from a spraying system, in accordance with embodiments of the invention. While the relationship shown in FIG. 12 is linear, other examples may illustrate a different relationship. In particular, a user may program a desired mathematical function to be representative of the relationship between the speed of a UAV and the amount of material that is provided.

In other examples, as the UAV accelerates, the spraying system may increase the amount of spraying materials that are output. As the UAV decelerates, the spraying system may decrease the amount of spraying materials that are output.

Additionally, the spraying system may vary the amount of spraying material that is dispersed based on the location of the UAV. In particular, the spraying system may vary the amount of spraying material that is dispersed based on the geographic location of the UAV as determined by a global positioning system (GPS). As such, the spraying system may initiate the spraying of material from the fluid reservoir when the UAV is in an area that is designated as being within a pre-determined zone, and the spraying system may cease the spraying of the material from the fluid reservoir when the spraying system has left the pre-determined zone. Geographic boundaries may be defined by the use of GPS, by the use of relational calculations of the UAV and a last-recognized geographic location, and by the detection of geofences.

The UAV is able to spray the field with a spraying fluid. The amount of fluid that is sprayed across the field may vary based on the dispersion rate of the liquid, the speed that the UAV is flying, weather factors, and the characteristics of the liquid itself. In examples, the spraying system may be used to spray non-liquid materials, such as seeds and powders. Additionally, the composition of the spraying material that is output from the spraying system may vary based on factors such as weather, speed, and other conditions. For example, if the UAV determines that it is raining, the UAV may alter the composition of the spraying material to be more viscous so as to make the spraying material less easy to dilute in the precipitation.

When an efficient spraying system that has a pump and a brushless motor is used, the spraying system that is used to transmit liquid from the fluid reservoir to liquid outlets of the spraying system may be significantly lighter than when a spraying system having a brush motor is used. This, in turn, may result in greater fuel efficiency when using an aerial mobile vehicle such as a UAV. As such, when lighter spraying systems are used, the UAV may be able to have a longer cruise duration than when heavier spraying systems are used.

Figure 13:
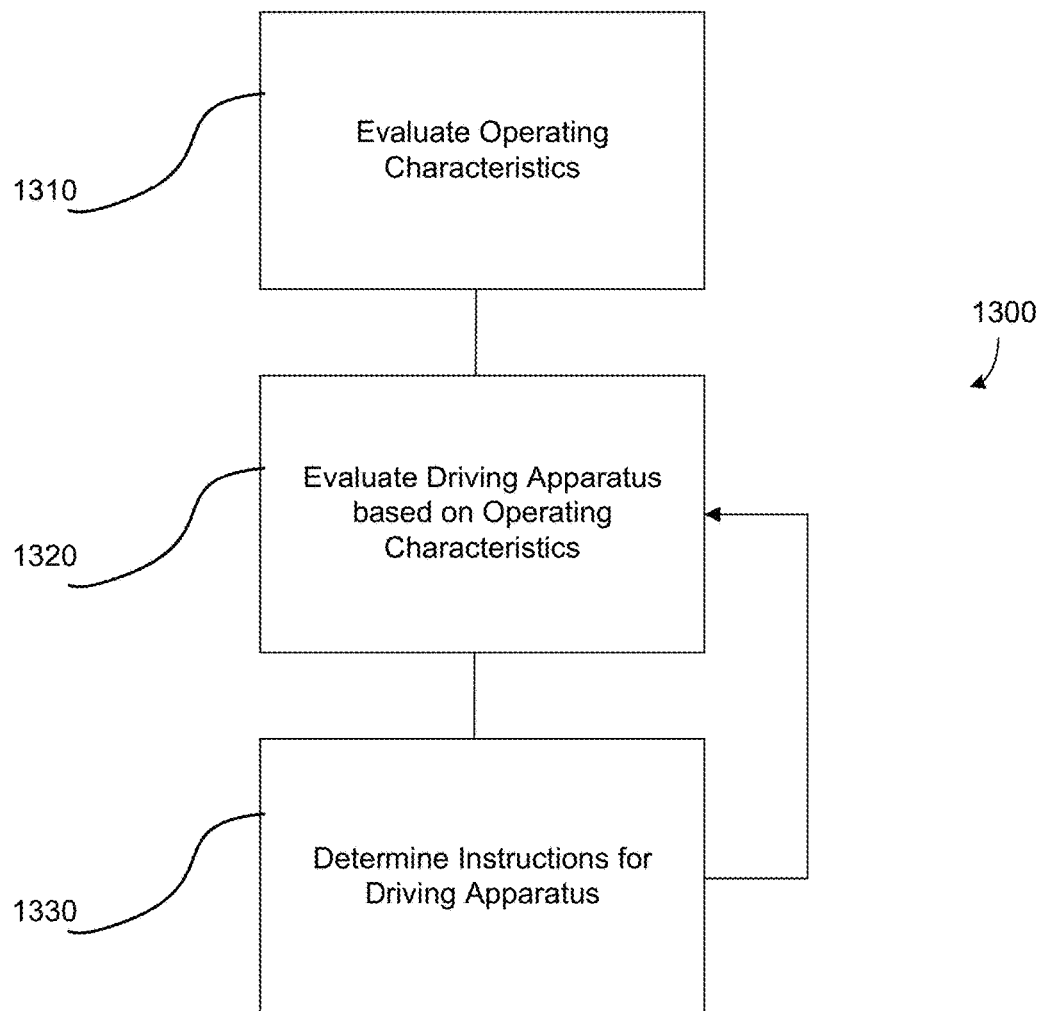
FIG. 13 illustrates a process of providing feedback to a control system, in accordance with embodiments of the invention.

FIG. 13 illustrates a process 1300 of providing feedback to a control system, in accordance with embodiments of the invention. In particular, FIG. 13 provides a process of evaluating operating characteristics; evaluating a driving apparatus based on operating characteristics; and determining instructions for the driving apparatus. At block 1310, operating characteristics of a driving apparatus are evaluated. In particular, the speed of the driving apparatus may be evaluated. Additionally, operating characteristics of the driving apparatus itself, such as magnetic flux and torque may be evaluated by a field oriented control electronic speed control.

After obtaining the operating characteristics, an evaluation of the driving apparatus based on operating characteristics may be performed at block 1320. In particular, characteristics associated with the spraying system may be calculated based on operating characteristics of the driving apparatus. For example, a correlation may exist between the amount of energy generated by the driving apparatus and an amount of fluid that is processed using a pump. When a pump is dry, the working current (or energy) of the driving apparatus may be zero. This, in turn, may indicate that there is no fluid in the pump. Alternatively, when there is fluid in the pump, a determination of the amount of fluid may be made based evaluating working current (or energy) of the driving apparatus.

By determining the number of pump cycles that occur based on the evaluated operating characteristics, a determination of fluid that has been transmitted through the spraying system may be calculated. This, in turn, may initiate an action that is based on the calculated information. For example, if the calculated fluid flow through the spraying system is found to meet or exceed a threshold amount of fluid, the UAV or the UAV operator may be notified that the UAV is running low on spraying fluids. This indicator, which may be considered a low-fluid, no-fluid, or status alarm of the amount of liquid within a liquid reservoir of the spraying system, may prompt the UAV to head home. Alternatively, the liquid-based alarm may prompt the UAV to head to a nearby refueling station. The UAV may use the refueling station to refuel spraying materials, to refuel gasoline/energy, or a combination of the two.

Further, once the driving apparatus has been evaluated based on operating characteristics, instructions for the driving apparatus may be determined at block 1330. Using the example above, once a fluid-based indicator has been initiated, instructions may be generated to have the UAV access a nearby refueling station. These instructions are then provided back to block 1320, where the instructions that are provided to the UAV may contextualize operating characteristics that are received.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 14:
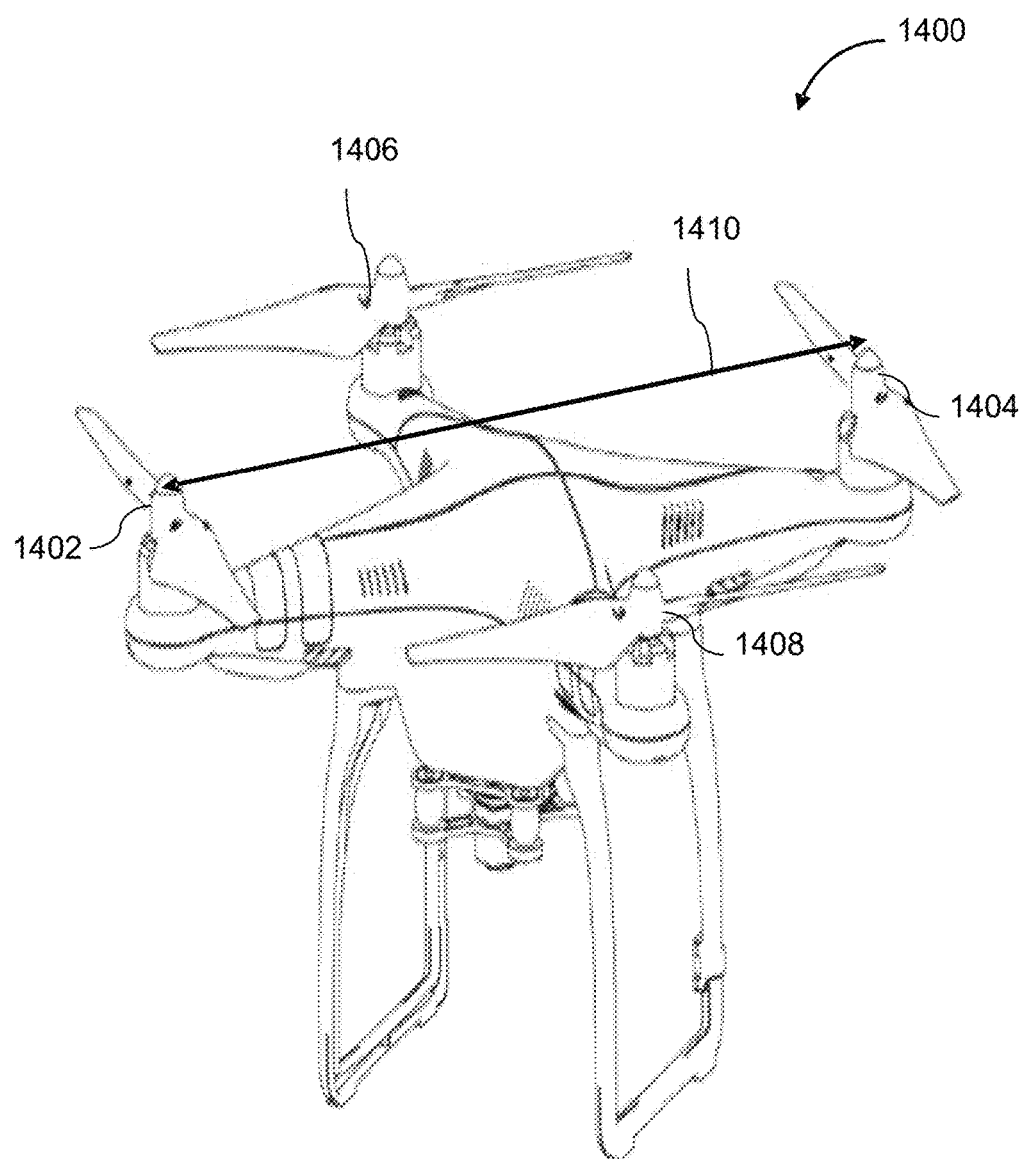
FIG. 14 illustrates an unmanned aerial vehicle, in accordance with an embodiment of the invention.

FIG. 14 illustrates an unmanned aerial vehicle (UAV) 1400, in accordance with embodiments of the present invention. The UAV may be an example of a movable object as described herein. The UAV 1400 can include a propulsion system having four rotors 1402, 1404, 1406, and 1408. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 410. For example, the length 1410 can be less than or equal to 2 m, or less than equal to 5 m. In some embodiments, the length 1410 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 15:
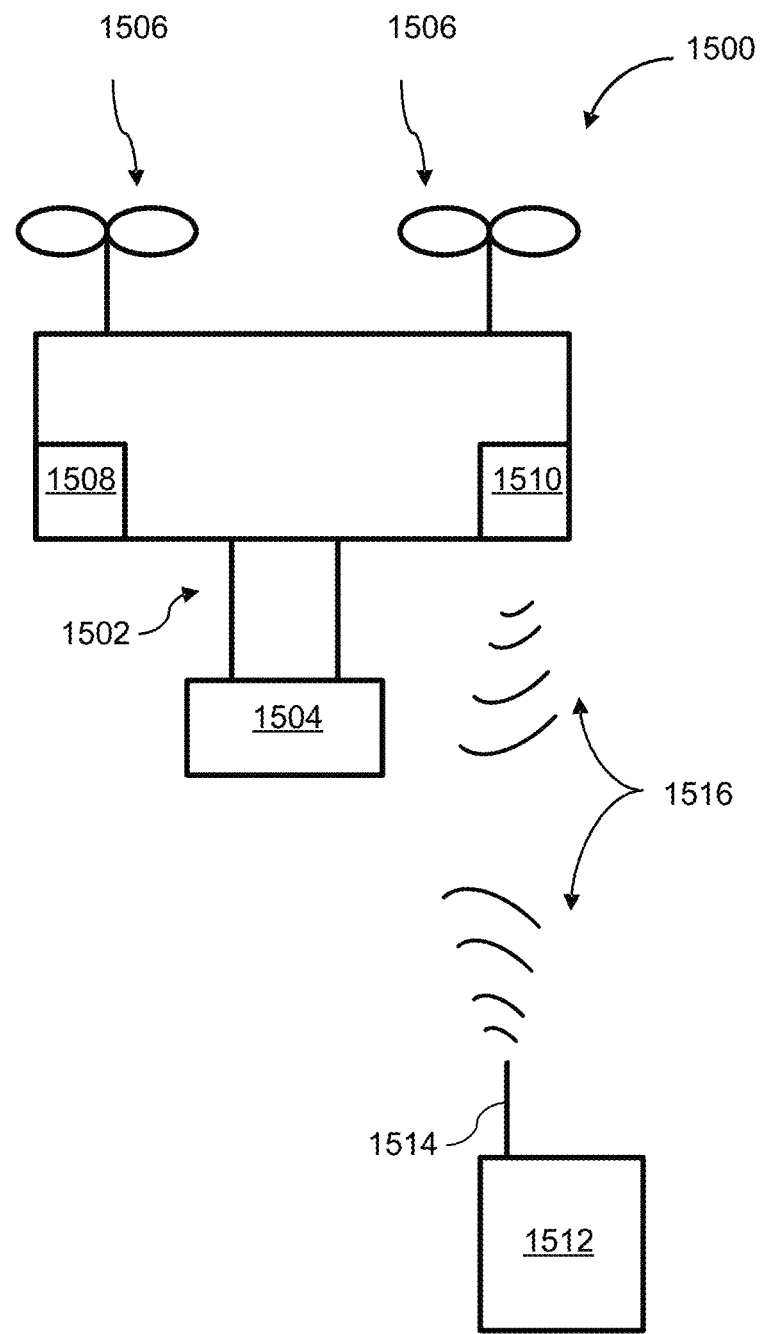
FIG. 15 illustrates a movable object including a carrier and a payload, in accordance with an embodiment of the invention.

FIG. 15 illustrates a movable object 1500 including a carrier 1502 and a payload 1504, in accordance with embodiments. Although the movable object 1500 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1504 may be provided on the movable object 1500 without requiring the carrier 1502. The movable object 1500 may include propulsion mechanisms 1506, a sensing system 1508, and a communication system 1510.

The propulsion mechanisms 1506 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1506 can be mounted on the movable object 1500 using any suitable means, such as a support element (e.g., a drive shaft) as described elsewhere herein. The propulsion mechanisms 1506 can be mounted on any suitable portion of the movable object 1500, such on the top, bottom, front, back, sides, or suitable combinations thereof.

In some embodiments, the propulsion mechanisms 1506 can enable the movable object 1500 to take off vertically from a surface or land vertically on a surface without requiring any horizontal movement of the movable object 1500 (e.g., without traveling down a runway). Optionally, the propulsion mechanisms 1506 can be operable to permit the movable object 1500 to hover in the air at a specified position and/or orientation. One or more of the propulsion mechanisms 1500 may be controlled independently of the other propulsion mechanisms. Alternatively, the propulsion mechanisms 1500 can be configured to be controlled simultaneously. For example, the movable object 1500 can have multiple horizontally oriented rotors that can provide lift and/or thrust to the movable object. The multiple horizontally oriented rotors can be actuated to provide vertical takeoff, vertical landing, and hovering capabilities to the movable object 1500. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1500 (e.g., with respect to up to three degrees of translation and up to three degrees of rotation).

The sensing system 1508 can include one or more sensors that may sense the spatial disposition, velocity, and/or acceleration of the movable object 1500 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1508 can be used to control the spatial disposition, velocity, and/or orientation of the movable object 1500 (e.g., using a suitable processing unit and/or control module, as described below). Alternatively, the sensing system 1508 can be used to provide data regarding the environment surrounding the movable object, such as weather conditions, proximity to potential obstacles, location of geographical features, location of manmade structures, and the like.

The communication system 1510 enables communication with terminal 1512 having a communication system 1514 via wireless signals 1516. The communication systems 1510, 1514 may include any number of transmitters, receivers, and/or transceivers suitable for wireless communication. The communication may be one-way communication, such that data can be transmitted in only one direction. For example, one-way communication may involve only the movable object 1500 transmitting data to the terminal 1512, or vice-versa. The data may be transmitted from one or more transmitters of the communication system 1510 to one or more receivers of the communication system 1512, or vice-versa. Alternatively, the communication may be two-way communication, such that data can be transmitted in both directions between the movable object 1500 and the terminal 1512. The two-way communication can involve transmitting data from one or more transmitters of the communication system 1510 to one or more receivers of the communication system 1514, and vice-versa.

In some embodiments, the terminal 1512 can provide control data to one or more of the movable object 1500, carrier 1502, and payload 1504 and receive information from one or more of the movable object 1500, carrier 1502, and payload 1504 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1506), or a movement of the payload with respect to the movable object (e.g., via control of the carrier 1502). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1508 or of the payload 1504). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1512 can be configured to control a state of one or more of the movable object 1500, carrier 1502, or payload 1504. Alternatively or in combination, the carrier 1502 and payload 1504 can also each include a communication module configured to communicate with terminal 1512, such that the terminal can communicate with and control each of the movable object 1500, carrier 1502, and payload 1504 independently.

In some embodiments, the movable object 1500 can be configured to communicate with another remote device in addition to the terminal 1512, or instead of the terminal 1512. The terminal 1512 may also be configured to communicate with another remote device as well as the movable object 1500. For example, the movable object 1500 and/or terminal 1512 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1500, receive data from the movable object 1500, transmit data to the terminal 1512, and/or receive data from the terminal 1512. Optionally, the remote device can be connected to the Internet or other telecommunications network, such that data received from the movable object 1500 and/or terminal 1512 can be uploaded to a website or server.

Figure 16:
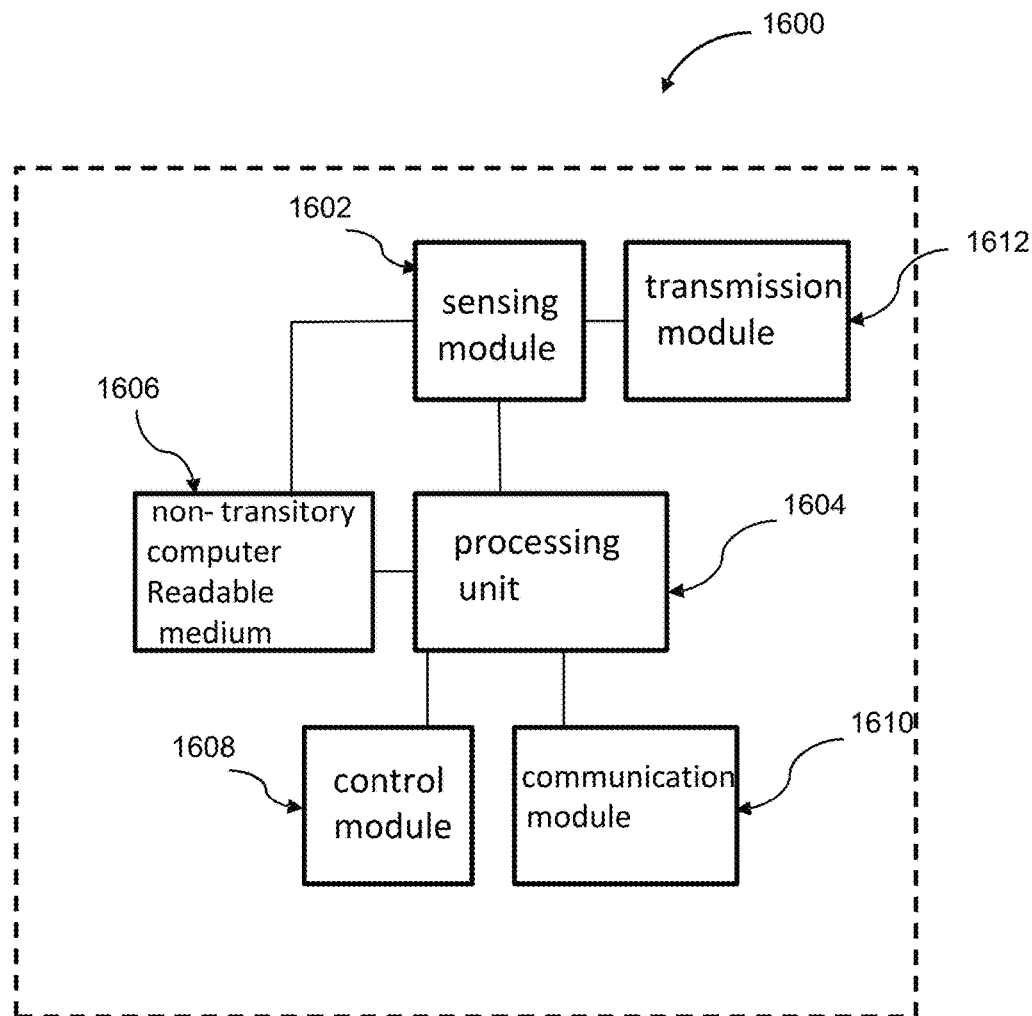
FIG. 16 is a schematic illustration by way of block diagram of a system for controlling a movable object, in accordance with an embodiment of the invention.

FIG. 16 is a schematic illustration by way of block diagram of a system 1600 for controlling a movable object, in accordance with embodiments. The system 1600 can be used in combination with any suitable embodiment of the systems, devices, and methods disclosed herein. The system 1600 can include a sensing module 1602, processing unit 1604, non-transitory computer readable medium 1606, control module 1608, and communication module 1610.

The sensing module 1602 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1602 can be operatively coupled to a processing unit 1604 having a plurality of processors. In some embodiments, the sensing module can be operatively coupled to a transmission module 1612 (e.g., a Wi-Fi image transmission module) configured to directly transmit sensing data to a suitable external device or system. For example, the transmission module 1612 can be used to transmit images captured by a camera of the sensing module 1602 to a remote terminal.

The processing unit 1604 can have one or more processors, such as a programmable processor (e.g., a central processing unit (CPU)). The processing unit 1604 can be operatively coupled to a non-transitory computer readable medium 1606. The non-transitory computer readable medium 1606 can store logic, code, and/or program instructions executable by the processing unit 1604 for performing one or more steps. The non-transitory computer readable medium can include one or more memory units (e.g., removable media or external storage such as an SD card or random access memory (RAM)). In some embodiments, data from the sensing module 1602 can be directly conveyed to and stored within the memory units of the non-transitory computer readable medium 1606. The memory units of the non-transitory computer readable medium 1606 can store logic, code and/or program instructions executable by the processing unit 1604 to perform any suitable embodiment of the methods described herein. For example, the processing unit 1604 can be configured to execute instructions causing one or more processors of the processing unit 1604 to analyze sensing data produced by the sensing module. The memory units can store sensing data from the sensing module to be processed by the processing unit 1604. In some embodiments, the memory units of the non-transitory computer readable medium 1606 can be used to store the processing results produced by the processing unit 1604.

In some embodiments, the processing unit 1604 can be operatively coupled to a control module 1608 configured to control a state of the movable object. For example, the control module 1608 can be configured to control the propulsion mechanisms of the movable object to adjust the spatial disposition, velocity, and/or acceleration of the movable object with respect to six degrees of freedom. Alternatively or in combination, the control module 1608 can control one or more of a state of a carrier, payload, or sensing module.

The processing unit 1604 can be operatively coupled to a communication module 1610 configured to transmit and/or receive data from one or more external devices (e.g., a terminal, display device, or other remote controller). Any suitable means of communication can be used, such as wired communication or wireless communication. For example, the communication module 1610 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1610 can transmit and/or receive one or more of sensing data from the sensing module 1602, processing results produced by the processing unit 1604, predetermined control data, user commands from a terminal or remote controller, and the like.

The components of the system 1600 can be arranged in any suitable configuration. For example, one or more of the components of the system 1600 can be located on the movable object, carrier, payload, terminal, sensing system, or an additional external device in communication with one or more of the above. Additionally, although FIG. 16 depicts a single processing unit 1604 and a single non-transitory computer readable medium 1606, one of skill in the art would appreciate that this is not intended to be limiting, and that the system 1600 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1800 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of determining a liquid flow in a spraying system, said method comprising:
controlling, using an electronic speed controller (ESC), a motor to operate, the motor driving a pump of the spraying system, and the ESC measuring a torque and a magnetic flux of the motor and controlling the motor based on the torque and magnetic flux;
determining an amount of liquid that is output from the spraying system during a pump cycle of the pump;
measuring, using the ESC within a threshold of precision, a number of pump cycles that occur within a given amount of time; and
calculating an amount of liquid flow in the spraying system based on the measured number of pump cycles and the determined amount of liquid that is output from the spraying system.

2. The method of claim 1, wherein the spraying system is held within a holder.

3. The method of claim 2, wherein the holder is a portable apparatus.

4. The method of claim 2, wherein the holder is a hand-held apparatus.

5. The method of claim 1, wherein the spraying system is mounted to an unmanned aerial vehicle (UAV).

6. The method of claim 5, wherein the UAV comprises a fluid reservoir.

7. The method of claim 1, wherein the spraying system comprises a pumping system that transmits liquid from a liquid reservoir to a liquid outlet.

8. The method of claim 7, wherein the liquid outlet comprises one or more nozzles.

9. The method of claim 1, wherein the pump has a variable volume.

10. The method of claim 9, wherein the pump has a periodically variable volume.

11. The method of claim 1, wherein the spraying system comprises a diaphragm pump.

12. The method of claim 1, where the spraying system is a pesticide spraying system.

13. The method of claim 1, further comprising:
measuring working current to detect a condition when there is no liquid in the pump and initiating an alarm based on the detection of the condition that there is no liquid in the pump.

14. The method of claim 1, wherein the pump has a fixed volume.

15. The method of claim 1, wherein the pump operates at a constant speed.

16. The method of claim 1, wherein the pump operates at a variable speed.

17. The method of claim 1, wherein the amount of liquid flow is calculated without aid of a flow meter.

18. The method of claim 1, wherein the ESC determines the number of pump cycles by assessing a speed of the motor.

19. The method of claim 1, wherein the ESC includes a field oriented control (FOV) ESC.

20. A non-transitory computer readable medium containing program instructions for determining a liquid flow in a spraying system, said computer readable medium comprising:
program instructions for controlling, through an electronic speed controller (ESC), a motor to operate, the motor driving a pump of the spraying system, and the ESC measuring a torque and a magnetic flux of the motor and controlling the motor based on the torque and magnetic flux;
program instructions for determining an amount of liquid that is output from the spraying system during a pump cycle of the pump;
program instructions for measuring, through the ESC within a threshold of precision, a number of pump cycles that occur within a given amount of time; and
program instructions for calculating an amount of liquid flow in the spraying system based on the measured number of pump cycles and the determined amount of liquid that is output from the spraying system.

21. The non-transitory computer-readable medium of claim 20, further comprising:

program instructions for measuring working current to detect the condition when there is no liquid in the pump and initiating an alarm based on the detection of the condition that there is no liquid in the pump.

22. A system for determining a liquid flow in a spraying system, said system comprising:
one or more processors of a mobile platform, individually or collectively configured to:
control, though an electronic speed controller (ESC), a motor to operate, the motor driving a pump of the spraying system, and the ESC measuring a torque and a magnetic flux of the motor and controlling the motor based on the torque and magnetic flux;
determine an amount of liquid that is output from the spraying system during a pump cycle of the pump;
measure, through the ESC within a threshold of precision, a number of pump cycles that occur within a given amount of time; and
calculate an amount of liquid flow in the spraying system based on the measured number of pump cycles and the determined amount of liquid that is output from the spraying system.

23. The system of claim 22, wherein the spraying system is mounted to an unmanned aerial vehicle (UAV).

24. The system of claim 23, wherein the spraying system is externally mounted to the UAV.

25. The system of claim 23, wherein the spraying system is internally mounted within the UAV.

26. The system of claim 23, wherein the mobile platform is remote to the UAV.

27. The system of claim 23, wherein the mobile platform is on-board the UAV.

28. A system for determining a spraying liquid flow, said system comprising:
a spraying system, wherein the spraying system comprises a pump; and
one or more processors of a mobile platform, individually or collectively configured to:
control, through an electronic speed controller (ESC), a motor to operate, the motor driving the pump of the spraying system, and the ESC measuring a torque and a magnetic flux of the motor and controlling the motor based on the torque and magnetic flux:
measure, through the ESC within a threshold of precision, a number of pump cycles of the pump that occur within a given amount of time; and
calculate an amount of liquid flow in the spraying system based on the measured number of pump cycles and a configured amount of liquid that is output from the spraying system.

29. The system of claim 28, wherein the ESC determines the number of pump cycles by assessing a speed of the motor.

* * * * *